(12) United States Patent
Tobimatsu et al.

(10) Patent No.: US 6,608,965 B1
(45) Date of Patent: Aug. 19, 2003

(54) VIDEO EDITOR, EDITOR, AND PORTABLE EDITOR

(75) Inventors: Noriaki Tobimatsu, Kanagawa (JP); Kenji Hyodo, Kanagawa (JP); Kimiko Yoshinari, Kanagawa (JP); Masami Ishii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/125,242

(22) PCT Filed: Dec. 17, 1997

(86) PCT No.: PCT/JP97/04661
§ 371 (c)(1),
(2), (4) Date: Dec. 22, 1998

(87) PCT Pub. No.: WO98/27554
PCT Pub. Date: Jun. 25, 1998

(30) Foreign Application Priority Data

Dec. 17, 1996 (JP) .............................. 8-337163
Sep. 30, 1997 (JP) .............................. 9-266875

(51) Int. Cl.$^7$ ................................. H04N 5/76
(52) U.S. Cl. ........................... 386/52; 360/13; 369/83
(58) Field of Search .............................. 386/4, 38, 52, 386/55, 64, 117; 358/906, 909.1; 360/13; 369/83; 348/376, 373, 375, 207.99, 239; 345/726, 723; H04N 5/26, 9/79, 5/225

(56) References Cited

U.S. PATENT DOCUMENTS 5,168,363 A * 12/1992 Kojima et al. .............. 358/906
5,355,450 A    10/1994 Garmon et al.
5,515,174 A *  5/1996 Abe et al. .................. 358/906
5,526,125 A    6/1996 Mori et al.

FOREIGN PATENT DOCUMENTS

| EP | 0 851 680 | 7/1998 |
| GB | 2 243 044 | 10/1991 |
| GB | 2 296 600 | 7/1996 |
| JP | 61-136391 | 8/1986 |
| JP | 63-87652  | 6/1988 |
| JP | 6-295567  | 10/1994 |
| WO | WO 96 26600 | 8/1996 |
| WO | WO 98 18255 | 4/1998 |

* cited by examiner

Primary Examiner—Thai Tran
(74) Attorney, Agent, or Firm—Frommer Lawrence & Haug LLP; William S. Frommer; Matthew K. Ryan

(57) ABSTRACT

A recording/reproducing unit is arranged below an operating panel, and a spacing in the recording/reproducing unit for mounting/dismounting a recording medium is arranged outside the operating panel. Alternatively, there are provided a reproducing unit for controlling the playback of camera-built-in type recording/reproducing apparatus and an editing unit for receiving reproduced video data, editing the video data and recording the edited data on a recording medium. Alternatively, there are provided a shuttle control unit and a resetting unit for resetting the shuttle mode without changing the operating position of the shuttle control unit. Still alternatively, there are provided a display unit, an operating panel, a recording/reproducing unit, a battery loading unit and a battery that can be mounted on or dismounted from the battery loading unit.

11 Claims, 40 Drawing Sheets

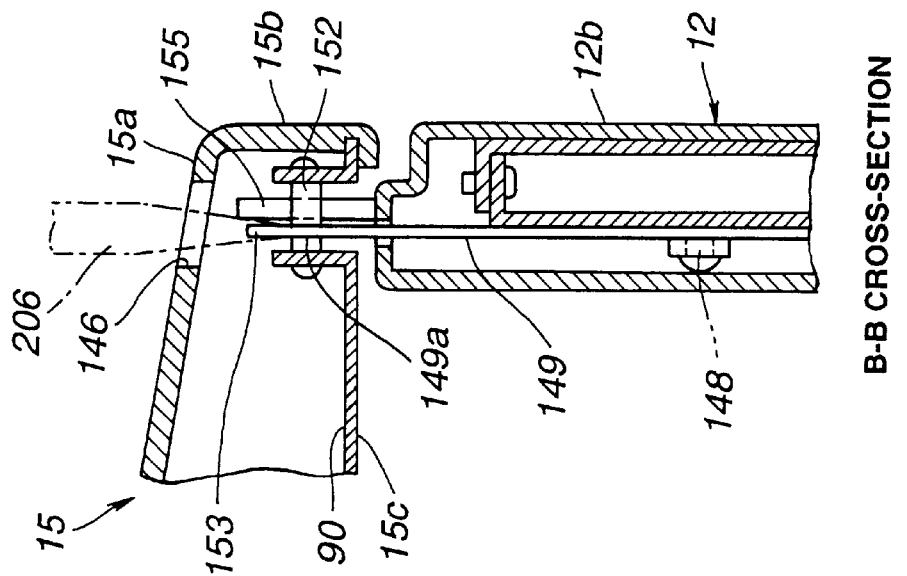
FIG. 38B  B-B CROSS-SECTION
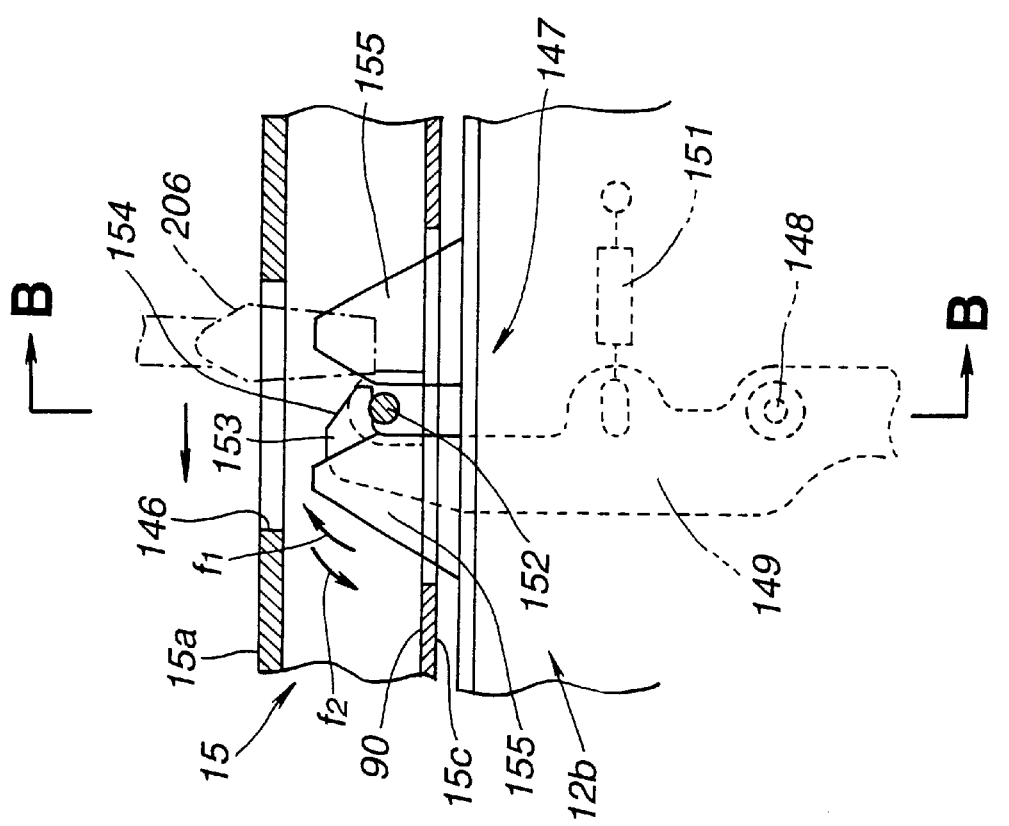
FIG. 38A

VIDEO EDITOR, EDITOR, AND PORTABLE EDITOR

TECHNICAL FIELD

This invention relates to a video equipment device, an editing device and a portable editing device. More particularly, it relates to video editing device, an editing device and a portable editing device which can be easily transported to the field of news data collection so that, on news data collection by photographing the news scene (video/speech) using video, the operation of editing the image/speech recorded on a video tape on a video camera to produce a tape for broadcast can be carried out immediately on the site of the news data collection after the end of the news data collection.

BACKGROUND ART

Up to now, a video editing device is usually a stationary type large-sized device installed in an editing studio of a broadcasting station or in a broadcasting car, while there lacks up to now a portable video editing device that can be easily transported to the site of news data collection. Thus, if it is desired to do the video editing operation on the site of news data collection immediately after collecting the news data using a video camera, it is necessary for the broadcasting car to go to the site with the cameraman. However, if news data collection is to be made in a remote place to which the broadcasting car cannot go or in an overseas branch station not having the broadcasting car, the news cameraman has to bring or transmit the video tape to the station to edit the news image or speech recorded on the tape using the video editing device in the editing studio in a broadcasting station in order to perform the video editing operation for producing the tape to be sent on the air.

Meanwhile, it is no other than the news cameraman actually engaged in the data collection who is most acquainted with the contents of the news and the highly strung feeling of the site of news data collection. Therefore, it is most desirable for the news cameraman himself to do the video editing operation. On the other hand, the cameraman returning from the site of news data collection to the broadcasting station tends to forget the highly strung on-the-site feeling because of fatigue and time lapse and is frequently at a loss how to edit the news as a video program. If the video editing operation is to be done by the editor working on the editing studio, the video editing operation itself is time-consuming, while the vivid on-the-spot feeling cannot be reproduced faithfully. In any case, the method of video editing in the editing studio is time-consuming in preparing the tape for news broadcasting, which is not desirable from the viewpoint of news broadcasting for which prompt report is indispensable. Thus, a portable video editing device, that can be easily transported to the site of news data collection, has been strongly desired.

For meeting such market needs, a portable type video editing device 300 shown in FIG. 1 has been proposed. In this video editing device 30, a video tape recorder 302 is accommodated in a small-sized rectangular main body portion 301 of the editing device and an upstanding operating panel 303 arranged on the front end face of the main body portion 301 is formed with a cassette insertion opening 304 via which the tape cassette is introduced into the video tape recorder 302 for editing the tape in the tape cassette by operation of an editing operating portion 305 on the operating panel 303 having a number of operating keys and switches.

However, if the cassette inserting opening 304 is provided in the operating panel 303, the effective area of the editing operating portion 305 is limited by the large-sized cassette insertion opening 304 to limit the degree of freedom of arrangement of a large number of operating buttons and switches to render it difficult to reduce the size of the main body portion 301 of the editing device. In addition, the upstanding operating panel 303 presents difficulties in operating the editing operating portion 305 from the viewpoint of human engineering.

Although an opening/closure panel 306, that can be opened and closed in the up-and-down direction, may be formed in a lower portion below the cassette insertion opening 304 of the operating panel 303, the effective area of the editing operating portion 305 is further reduced thus inevitably increasing the size of the main body portion 301 of the editing device. Moreover, the mounting site needs to be selected since a foreign object present upon the front side of the opening/closure panel 306 renders it impossible to open or close the panel 306. This is inconvenient in doing the video editing operation on the site of news data collection in view of the demand for a prompt operation.

DISCLOSURE OF THE INVENTION

The present invention has been proposed for solving the above problems. It is therefore an object of the present invention to provide a video editing device, an editing device and a portable editing device which can be reduced significantly in size at the same time as high operatability is assured.

For accomplishing the above object, the present invention provides a video editing apparatus wherein a recording/reproducing unit is arranged in a lower portion of an operating panel, and wherein a spacing for mounting/dismounting a recording medium in the recording/reproducing unit is arranged outside the operating panel.

Preferably, the operating panel is of the openable/closable type; and the recording medium in the recording/reproducing unit can be mounted/dismounted on opening the operating panel.

Preferably, the operating panel is rotatable in the up-and-down direction about a rotational fulcrum point as the center of rotation; and a recording medium mounting/dismounting mechanism of the recording/reproducing unit is of the pop-up type in which the recording medium mounting/dismounting mechanism is uplifted and lowered in substantially the same direction as the operating panel.

Preferably, the operating panel is of the openable/closable type in which it can be collapsed on the top of the operating panel.

Preferably, the recording/reproducing unit is comprised of a playback-dedicated portion and a recording-dedicated portion.

Preferably, the recording/reproducing unit is comprised of a cassette video tape recorder.

Preferably, the video editing apparatus includes carrying means.

For accomplishing the above object, the present invention also provides a video editing apparatus including reproducing means for controlling playback of a camera-built-in type recording/reproducing apparatus and editing means for accepting the reproduced video data, editing the video data and recording the edited data on a recording medium.

Preferably, the video editing apparatus includes playback object switching means for switching a control object of the playback control means to the camera-built-in type recording/reproducing apparatus or to the video editing apparatus.

Preferably, the playback control means and the playback object switching means are arranged on an operating panel.

Preferably, the video data is set as data conforming to Serial Digital Interface (SDI).

Preferably, the video editing apparatus includes sole display means for alternately displaying video data sent from the camera-built-in type recording/reproducing apparatus and video data edited by the editing means.

For accomplishing the above object, the present invention also provides a editing apparatus including shuttle control means and resetting means for resetting the shuttle mode without varying the operating position of the shuttle control means.

Preferably, the video editing apparatus includes jog control means and resetting means for effecting transfer from the shuttle mode of the shuttle control means to the jog mode of the jog control means responsive to an operation of the jog control means.

Preferably, the editing apparatus includes means for determining an editing point based on the operation of the jog control means and for recording the editing point.

Preferably, the first operation of the jog control means is an operation for resetting the shuttle control means and the second and the following operations are the operations for determining the editing point.

Preferably, the jog control means has a jog mode by movement in a sole plane and a reset mode by pressing down in a direction perpendicular to the plane. There is provided detection means for detecting the pressing down of the jog control means.

Preferably, the editing apparatus includes a mode for determining the editing point every pressing-down operation of the jog control means and pre-setting means for switching the jog mode/shuttle mode every pressing-down operation.

For accomplishing the above object, the present invention also provides portable editing apparatus including a display unit, an operating panel, a recording/reproducing unit, a battery loading unit and a battery that can be mounted on or dismounted from the battery loading unit.

Preferably, the battery loading unit is constructed in common with the camera-built-in type recording/reproducing apparatus.

Preferably, the battery loading unit has a loading mechanism of the same structure as the battery loading/unloading mechanism of the camera-built-in type recording/reproducing apparatus.

Preferably, the display unit is constructed so as to be opened/closed, and the battery loading unit is arranged on an upper panel outside the opening/closing space of the display unit.

BRIEF DESCRIPTION OF THE DRAWINGS

FIGS. 38A–38B show essential portions of the portable video editing device used for illustrating the manual unlocking of the lock unit.

BEST MODE FOR CARRYING OUT THE INVENTION

Figure 1:
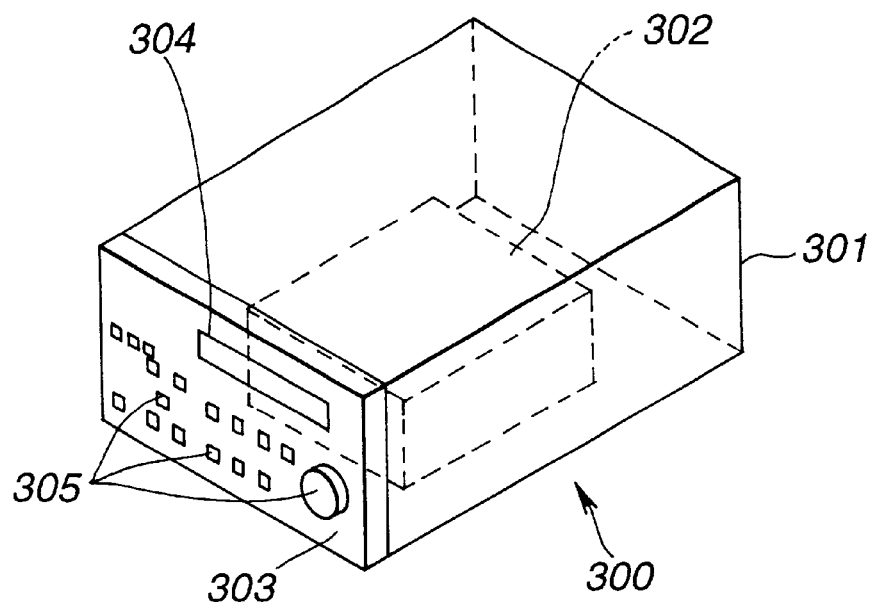
FIG. 1 is a perspective view showing a typical conventional video editing device as contrasted to a portable video editing device embodying the present invention.
Figure 2:
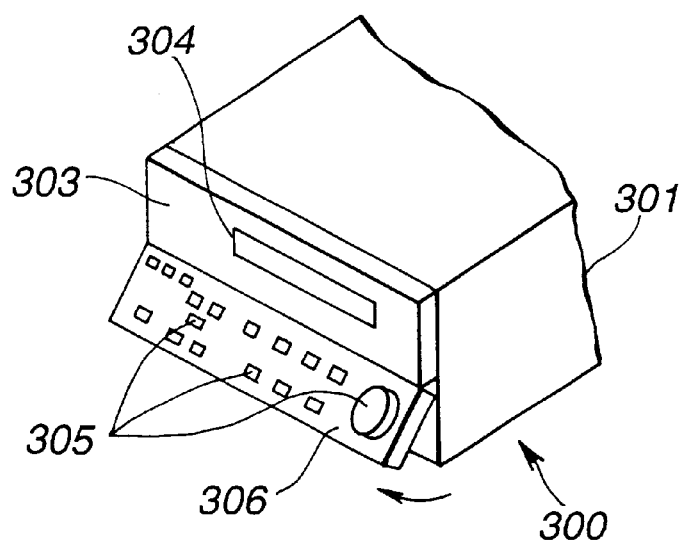
FIG. 2 is a perspective view showing a modification of the conventional portable video editing device.
Figure 3:
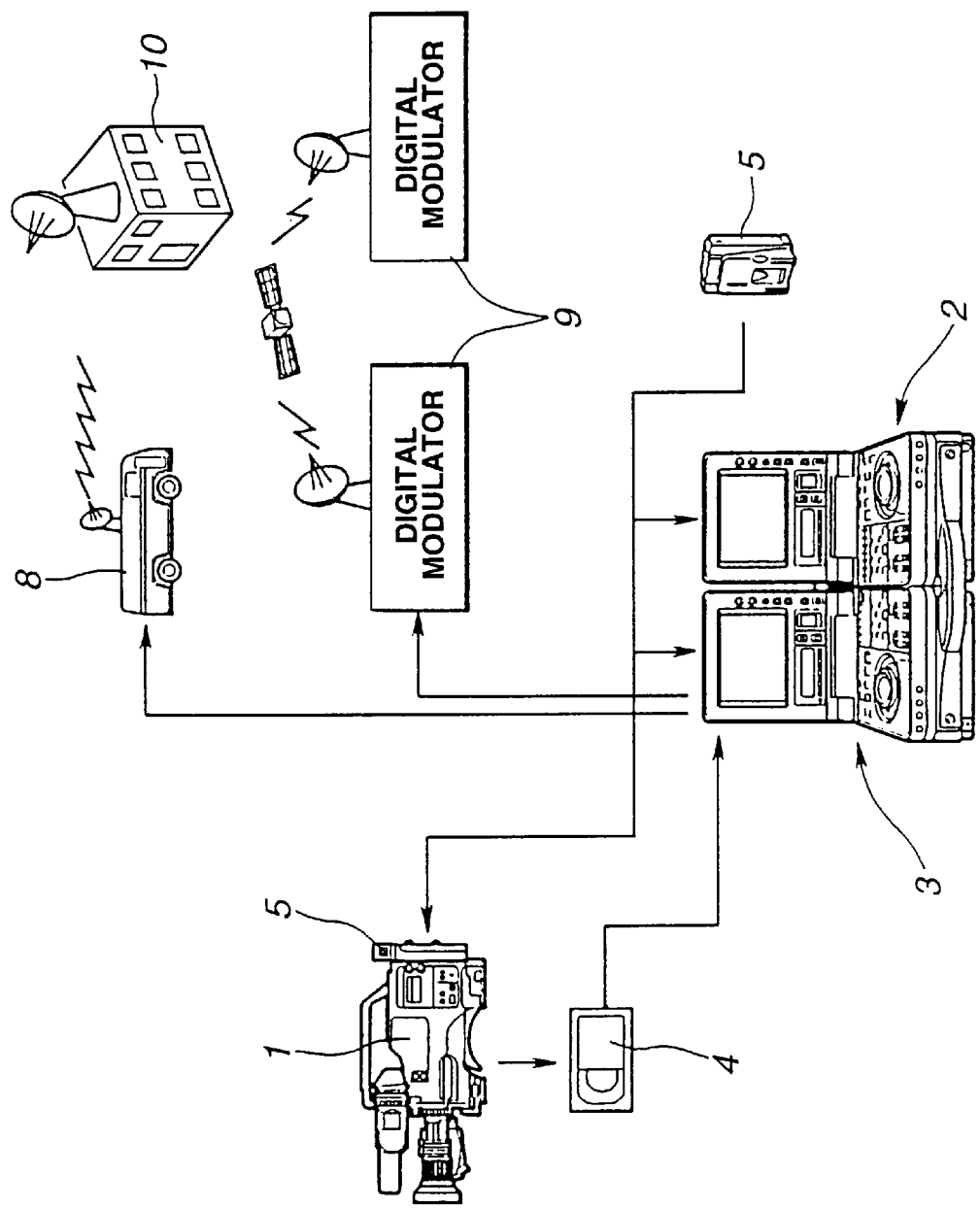
FIG. 3 shows a portable video editing device of the present invention when applied to a video system.

Referring to the drawings, preferred embodiments of the present invention will be explained in detail. The portable video editing device embodying the present invention will be explained by referring to FIGS. 3 to 43 in the order of the following items (1) to (7).
(1) Explanation of the structure of a video editing system
(2) Schematic explanation of two portable video editing devices
(3) Explanation of a display panel of the portable video editing device
(4) Explanation of an operating portable video editing device
(5) Explanation of the video editing operation
(6) Explanation of the coupling method of two portable video editing devices
(7) Explanation of the battery loading unit
(8) Explanation of the jog/shuttle dial
(9) Explanation of the opening/closure unit of the display and operating panels
(10) Explanation of a cassette compartment
(11) Explanation of an automatic ejection unit of a cassette compartment
(12) Explanation of the method for maintenance of a video tape recorder
(13) Explanation of connection means between the operating panel and the cassette compartment
(14) Explanation of the tape loading unit
(1) Explanation of the Structure of a Video Editing System FIG. 3 shows the structure of a system for doing video editing using this portable video editing device. For doing news data collection using a camera-built-in type video tape recorder 1 as an example of the video camera (trade name; registered trade mark owned by the SONY CORPORATION) corresponding to a camera-built-in type recording/reproducing apparatus, two portable video editing devices 2, 3 that can be transported to the site of data collection are used. Of these two portable video editing devices 2, the first one 2 is designed as a recorder dedicated to recording, while the second one 3 is designed as a player dedicated to reproduction. These two portable video editing devices 2, 3 use a tape cassette 4 as a recording medium. The tape cassette 4 is used in common by the camera-built-in type video tape recorder 1. However, the two portable video editing devices 2, 3 also can use other tape cassettes. Meanwhile, there are two sorts of the tape cassette, namely a digital cassette and an analog cassette. For the camera-built-in type video tape recorder 1 and the two portable video editing devices 2, 3, a battery 5 that can be mounted on or dismounted from these in common is used. The two-source system in which the usable power source is set on switching between a battery and the ac source is used.

In case of news data collection by photographing a news (image/speech) using the camera-built-in type video tape recorder 1, one or both of the two portable video editing devices 2, 3 is operated by the operator on the site of news data collection so that the operator can edit the video/speech recorded on a original tape of the camera-built-in type video tape recorder 1 to execute the video editing operation of creating the tape for broadcast (tape cassette 4) immediately.

This video editing operation may be executed by a method selected from the following two methods. One of these is to effect playback control of the camera-built-in type video tape recorder 1 by the portable video editing device 2 on the recorder side, to reproduce the original tape by the camera-built-in type video tape recorder 1 and to record the video/speech edited on a recording tape (tape cassette 4) set on the portable video editing device 2, with the reproduced video/speech being monitored on a display unit of the recorder side portable video editing device 2 or on a display unit of the player side portable video editing device 3. The other method is to record the video/speech edited on the recording tape (tape cassette 4) set on the portable video editing device 2 on the recorder side, with the original tape of the camera-built-in type video tape recorder 1 being set on the player side portable video editing device 3 and reproduced. Meanwhile, the player side portable video editing device 3 can also be playback-controlled by the recorder side portable video editing device 2.

Figure 4:
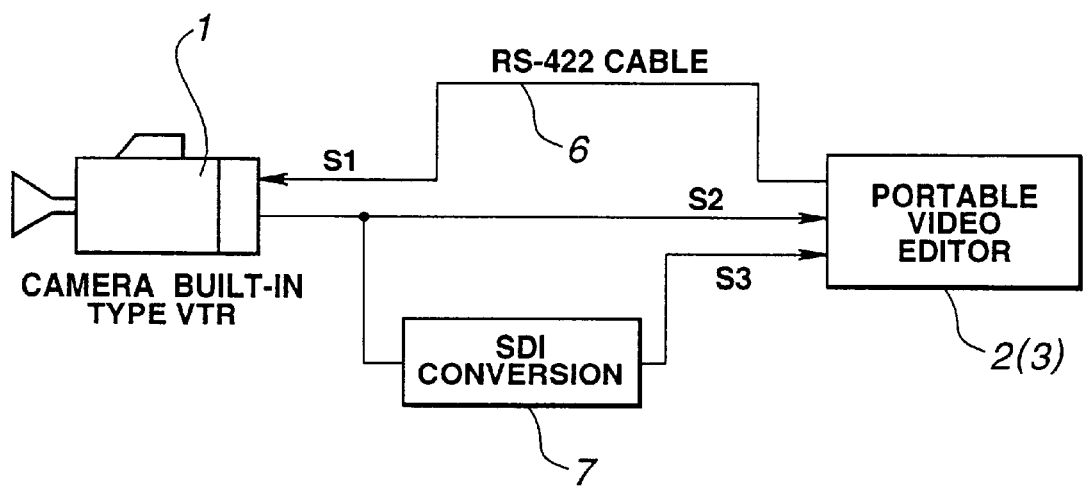
FIG. 4 is a block circuit diagram showing a transmission system for transmission of video and control signals between a camera-built-in video tape recorder and the portable video editing device

FIG. 4 shows the transmission system for video signals and control signals between the camera-built-in type video tape recorder 1 and the portable video editing devices 2, 3 when the camera-built-in type video tape recorder 1 is playback-controlled by one of the two portable video editing devices 2, 3. A RS-422 cable 6, a connection cable designed to cope with VTR-9 pin protocol, is used for interconnecting the two portable video editing devices 2, 3 and for interconnecting one of the portable video editing devices 2, 3 and the camera-built-in type video tape recorder 1. From one of the two portable video editing devices 2, 3, a playback control signal $S_1$ is sent from one of the two portable video editing devices 2, 3 over cable 6 to the camera-built-in type video tape recorder 1 for reproducing an original tape in the camera-built-in type video tape recorder 1. Video data (picture/speech) $S_2$, which is the composite video signals reproduced from the original tape, is received by one of the two portable video editing devices 2, 3 for performing a video editing operation. The editing operation can be performed efficiently because the video data $S_2$ is the SDI video signal $S_3$, which is based on the serial digital interface (SDI) standard converted by a SDI converter 7, and data transmission between the portable video editing devices 2, 3 can be performed speedily. The video data transmitted between the two portable video editing devices 2, 3 are naturally SDI video signals $S_3$.

The video data of a tape for news broadcast, prepared by the video editing operation by the portable video editing devices 2, 3, can be transmitted speedily to a broadcasting station 10 by a system configured for sending SDI video signals S4 by a satellite network using a MW sending system 8 or a digital modulator 9 as shown in FIG. 3. The video-edited news (picture/speech) can be directly sent on air by the broadcasting station 10. Consequently, the time involved in collection of news data until broadcasting the news can be shortened significantly as compared to the conventional practice to realize fast news broadcasting.

(2) Explanation of Schematics of Two Portable Video Editing Devices

Figure 5B:
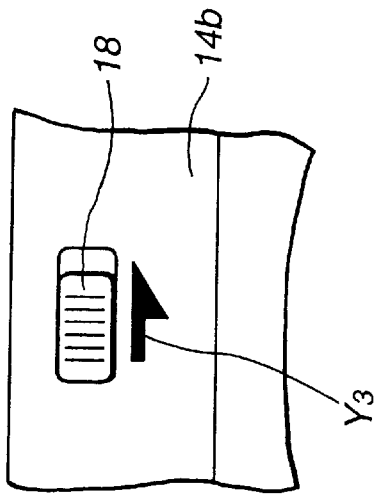
FIGS. 5A–5B are a perspective view showing two of the above portable video editing devices.
Figure 5A:
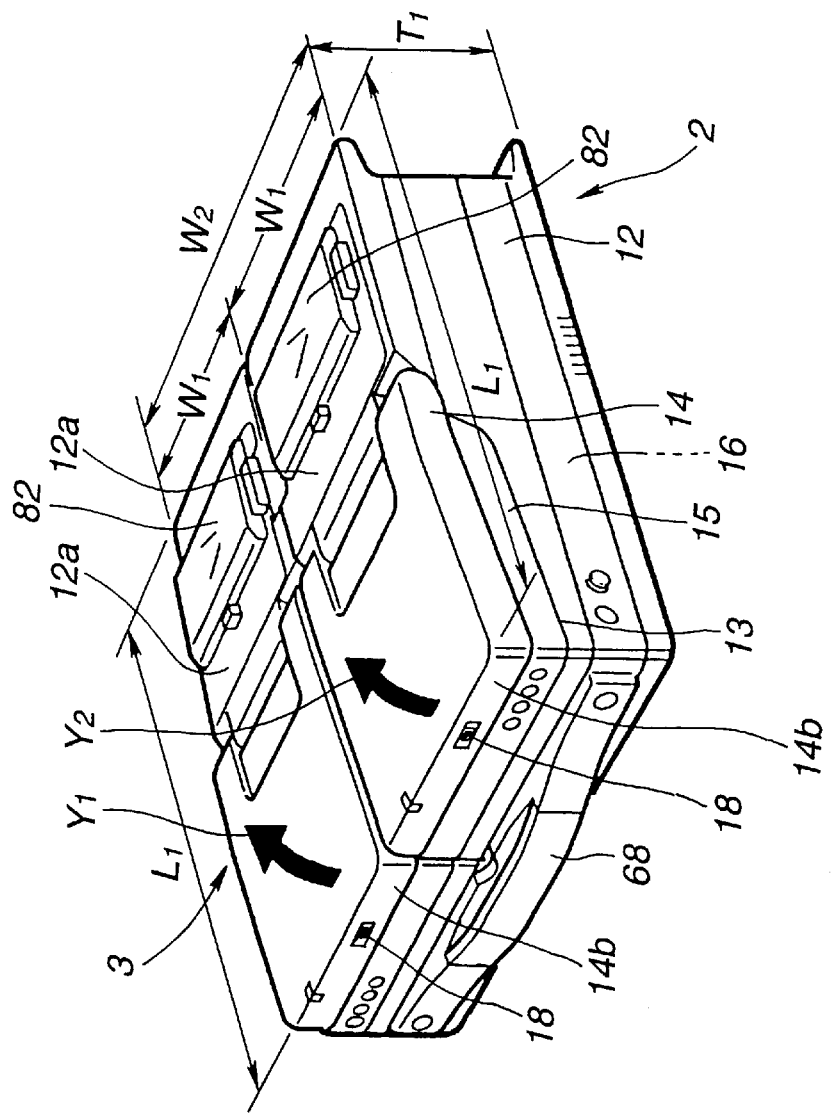
Figure 6:
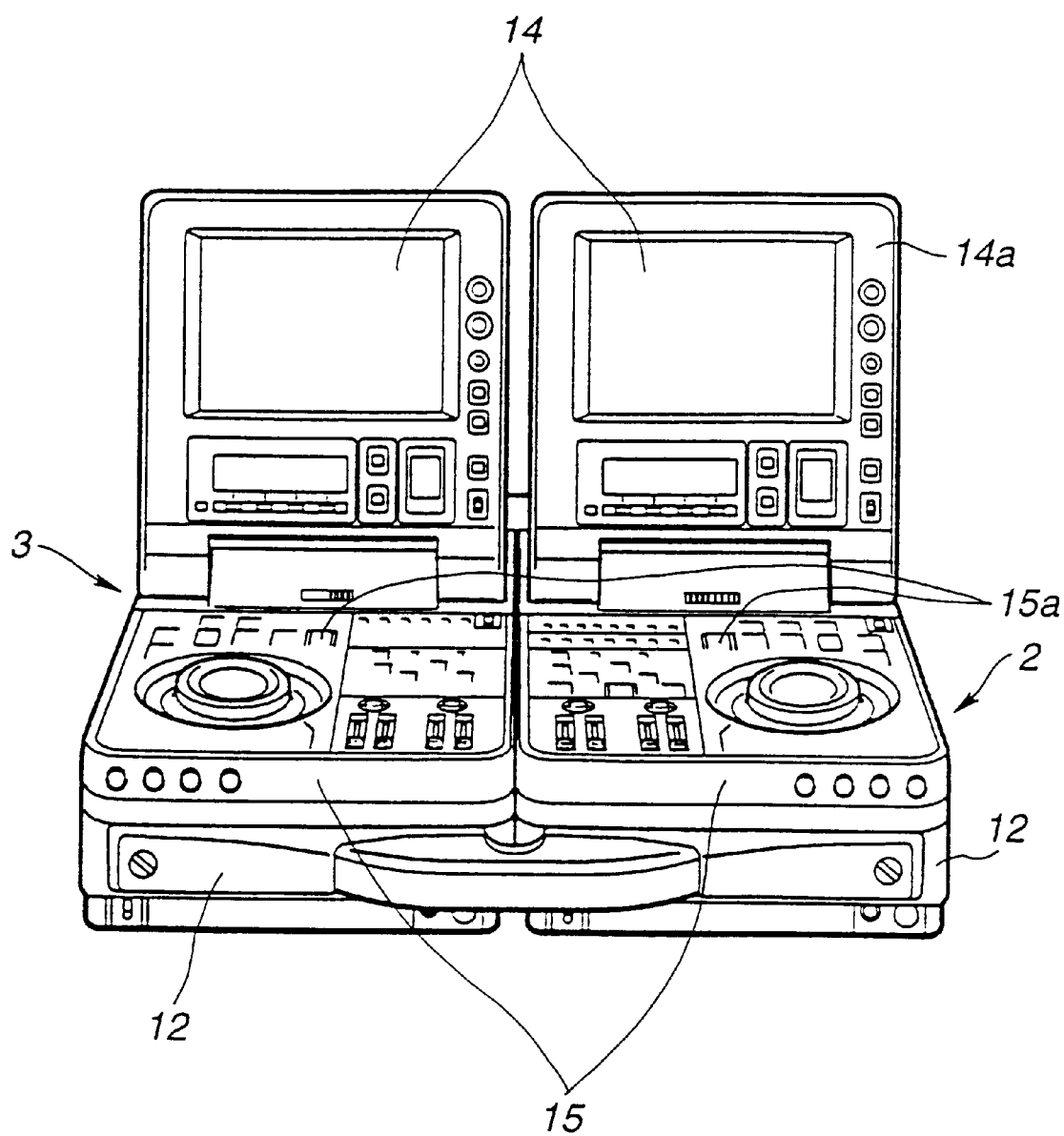
FIG. 6 is a front view showing the state in which a display panel of each of the two of the above portable video editing devices being opened.
Figure 7:
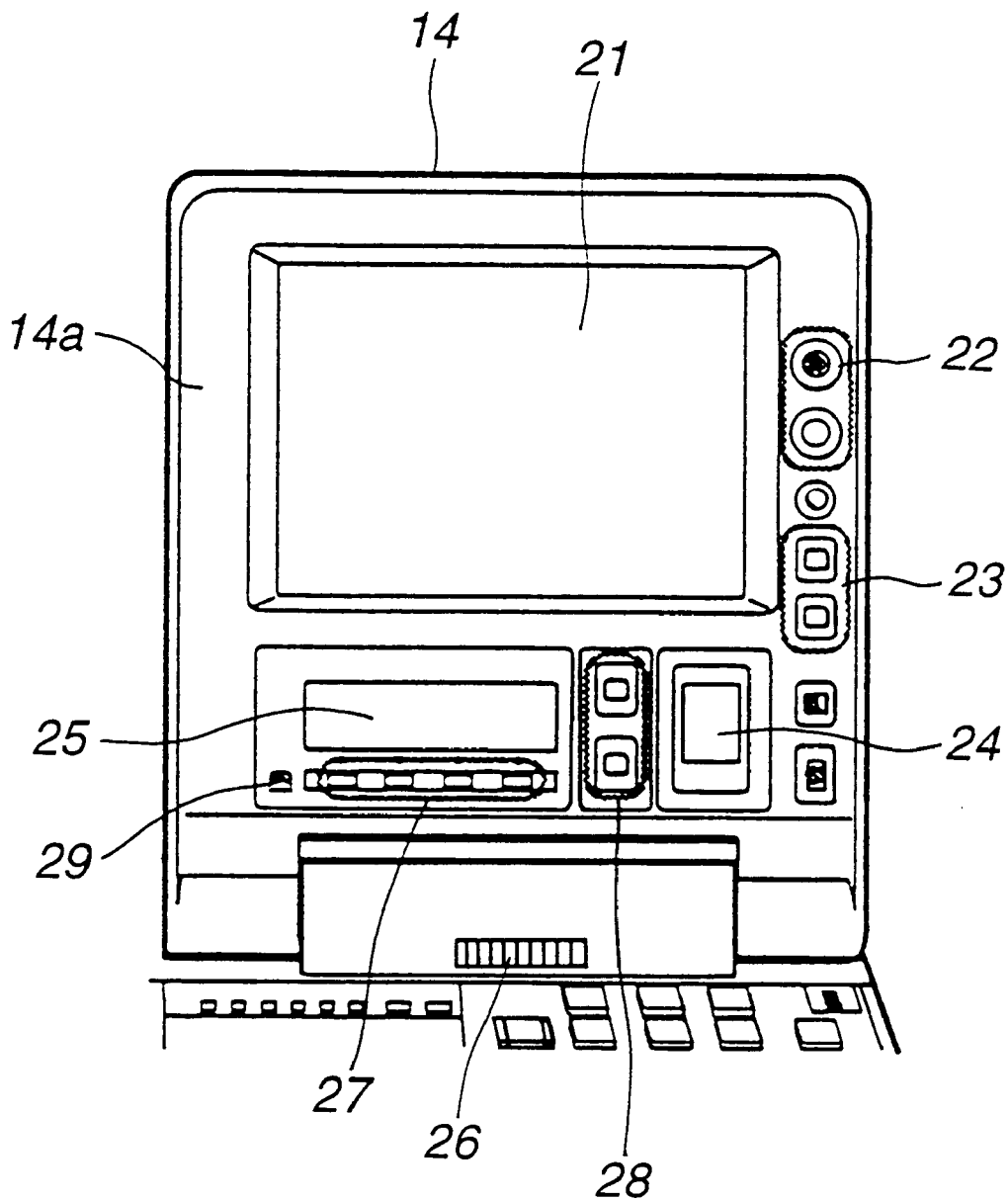
FIG. 7 is a front view showing the structure of the display panel.

Referring to FIGS. 5A and 6, the two portable video editing devices 2, 3, corresponding to an editing device, are of the same shape and size, except a small number of component parts, such as operating buttons and switches. The portable video editing devices 2, 3 are of small outer size, with a length $L_1$ in the fore-and-aft direction of approximately 443 mm, a width $W_1$ in the left-and-right direction of approximately 211 mm and a maximum thickness $T_1$ of approximately 149 mm, with the rear end of each device being of maximum thickness. The two portable video editing devices 2, 3 are configured for being arrayed side-by-side in a left-and-right direction and for being interconnected in this state by coupling means 6, as later explained, for facility in transportation. In the connected state, the two portable video editing devices 2, 3 are of a small size, with the overall width in the left-and-right direction $W_2$ being approximately 422 mm. Thus, the portable video editing devices 2, 3 can not only be separated and transported easily, but also can be combined together and transported in this state easily.

In the forward portion of the upper surface panel 12a of the main body portion of the video editing device 12 of each of the two portable video editing devices 2, 3 is formed a recess 13 within which a display panel 14 and an operating panel 15 are housed. In the lower portion of the operating panel 15 in the main body portion of the video editing device 12 is housed a video tape recorder 16 corresponding to the recording/reproducing unit. On an upper portion of the rear end of the upper surface panel 12a is provided a battery attachment section 17. The display panel 14 and the operating panel 15 are both of the openable type by a vertical swing type system, such that, during non-using time, as during transport, the display panel 14 is collapsed to an upper portion of the operating panel 15, as shown in FIG. 5A (by collapsing in a direction opposite to that shown by arrows $y_1$ and $y_2$ in FIG. 5A) for compactly accommodating the display panel 14 and the operating panel 15 within the recess 13.

During the video editing operation, the display panel 14 is swung open upward as shown in FIG. 6. The operating panel 15 is locked relative to the main body portion 12 of the video editing device in the closed position shown in FIG. 5A by lock means as later explained, while the display panel 14 is locked relative to the main body portion 12 of the video editing device in the closed position shown in FIG. 5A by lock means similarly as later explained. By sliding an unlock knob 18, attached to the front end face of the display panel 14, in a direction indicated by arrow $y_3$ in FIG. 5B, the display panel 14 is unlocked so that the display panel 14 can be opened to the open position shown in FIG. 3.

(3) Explanation of Display panel of the Portable Video Editing Devices 2, 3

On a front side of the display panel 14 of each portable video editing device 2 or 3, there are provided a liquid crystal display (LCD) monitor for displaying a playback picture or an E—E picture and for superimposing time data or a set-up menu of the portable video editing device, a BRIGHT/CONTRAST knob 22, a time code operating button 23, an audio level meter 24, an audio level meter 24, a sub LCD 25 and an audio monitor speaker 26. If the display panel 14 is collapsed to the closed position shown in FIG. 5, the LCD (liquid crystal monitor 21, BRIGHT/CONTRAST knob 22, time code operating button 23, audio level meter 24, audio level meter 24, sub-LCD 25 and the audio monitor speaker 26 are all closed. Meanwhile, the above-mentioned operating knobs and buttons as well as operating knobs and buttons are all of the self-lit type.

Figure 8:
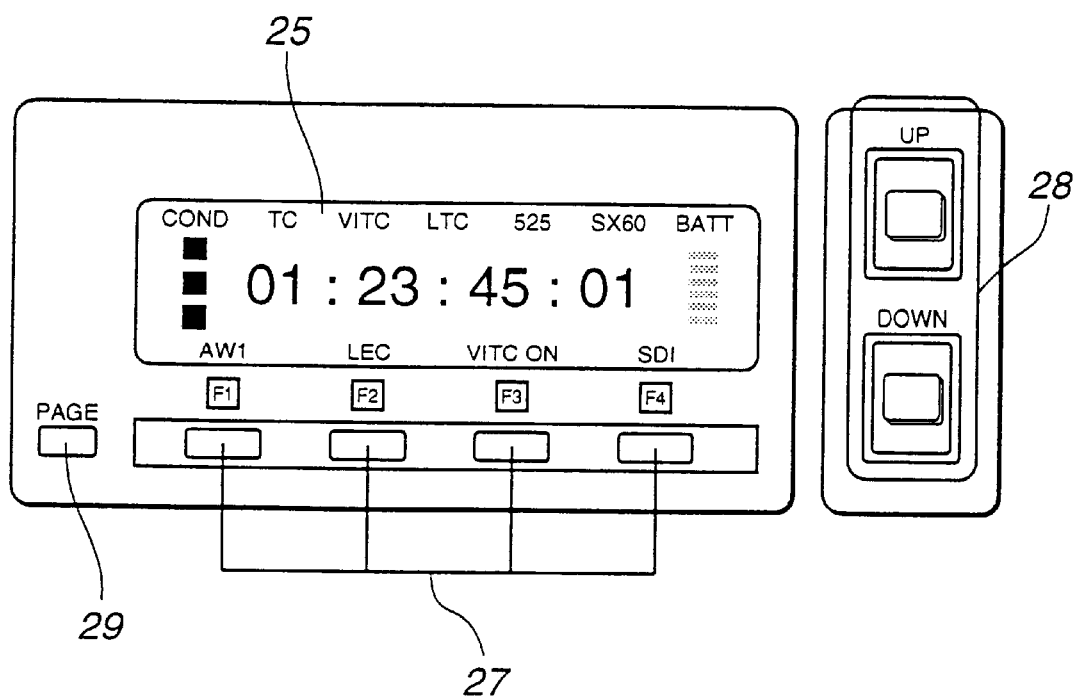
FIG. 8 is an enlarged front view of a portion of the display panel.

Referring to FIG. 8, on the sub-LCD 25 are displayed home pages of the LCD menu necessary for the video editing operation, such as channel condition input video level display, time code display, VITC/LTC display, 525/625 display, cassette type-residual tape volume display, battery residual volume display, audio setting page selection, VITC/AUTO display, VITCON/OFF display or source vide signal display. Around the sub LCD 25, there are plural operating buttons 27 for setting desired items of the home pages and an UP/DOWN button 28 for modifying the setting.

(4) Explanation of Operating panel of the Portable Video Editing Devices 2, 3

Figure 9:
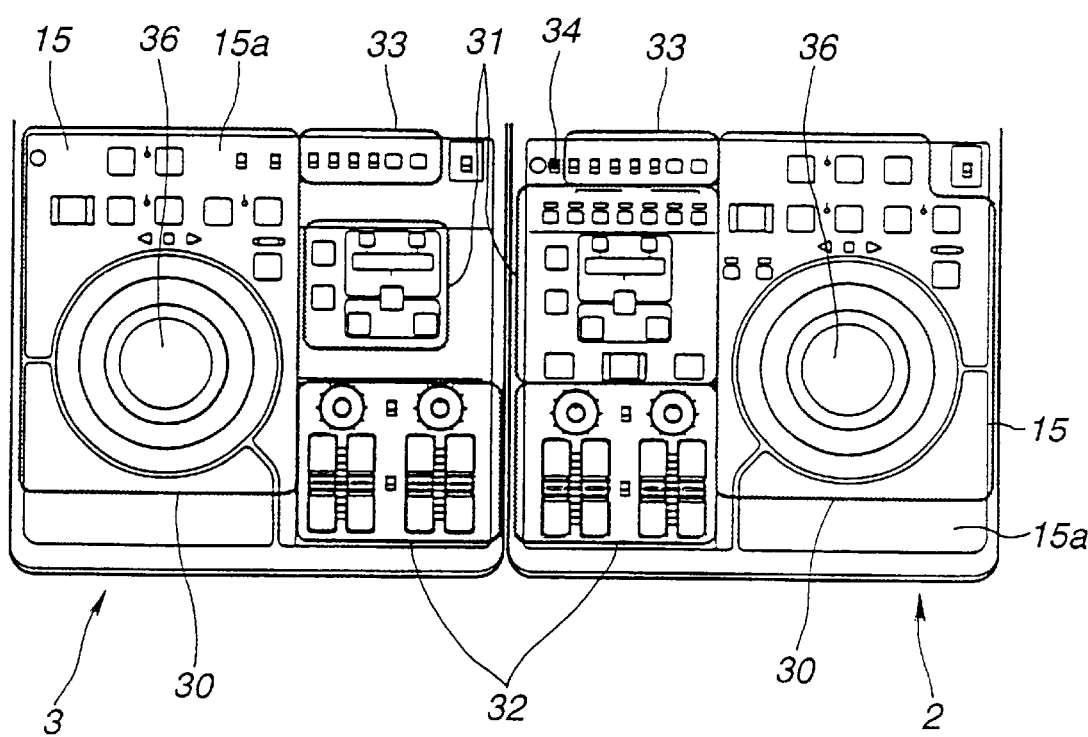
FIG. 9 is a front view showing an operating panel of the portable video editing device.

Referring to FIG. 9, there are provided on the upper surface of the operating panel 15 of each of the portable video editing devices 2, 3 a controller 30 for the tape running system, an editing operation unit 31, an audio controller 32 and a time code/setup menu operating unit 33. A RECINHI (recording inhibition) switch 34 is provided on the side portable video editing device 2 operating as the recorder.

Figure 10B:
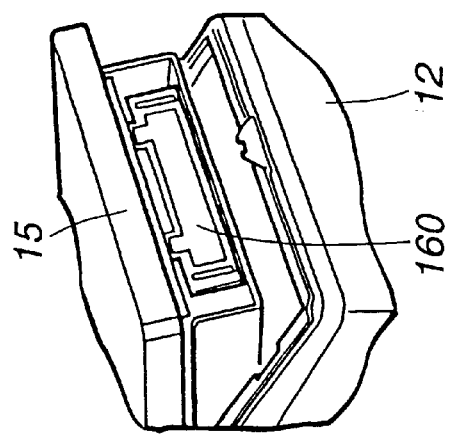
FIGS. 10A–10B are a plan view showing an operating panel of the portable video editing device placed on the recorder side.
Figure 10A:
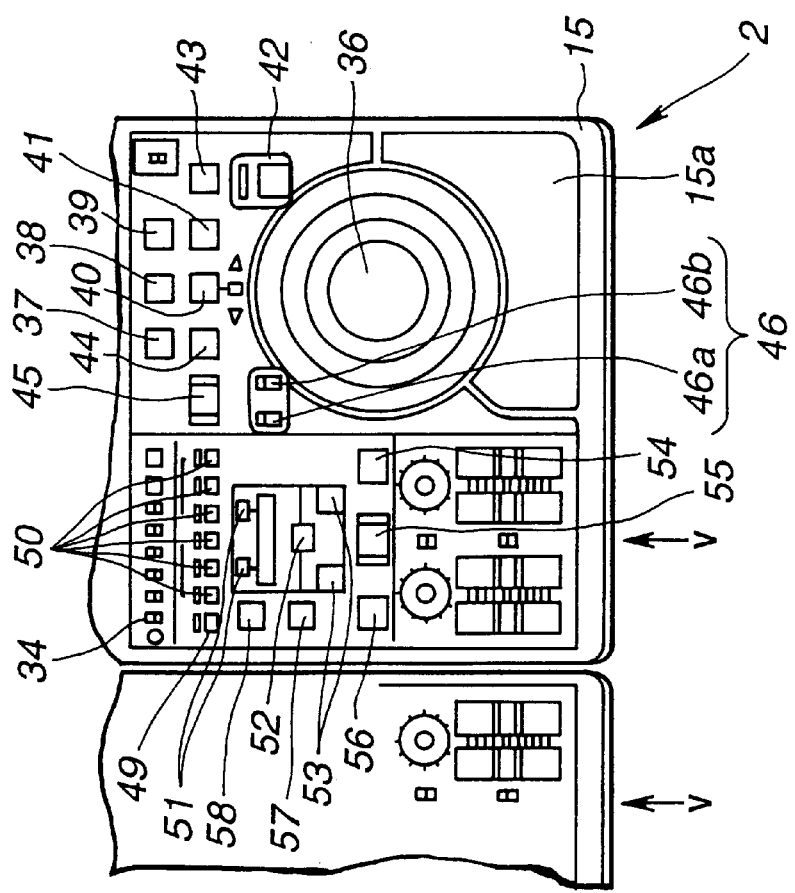
Figure 11:
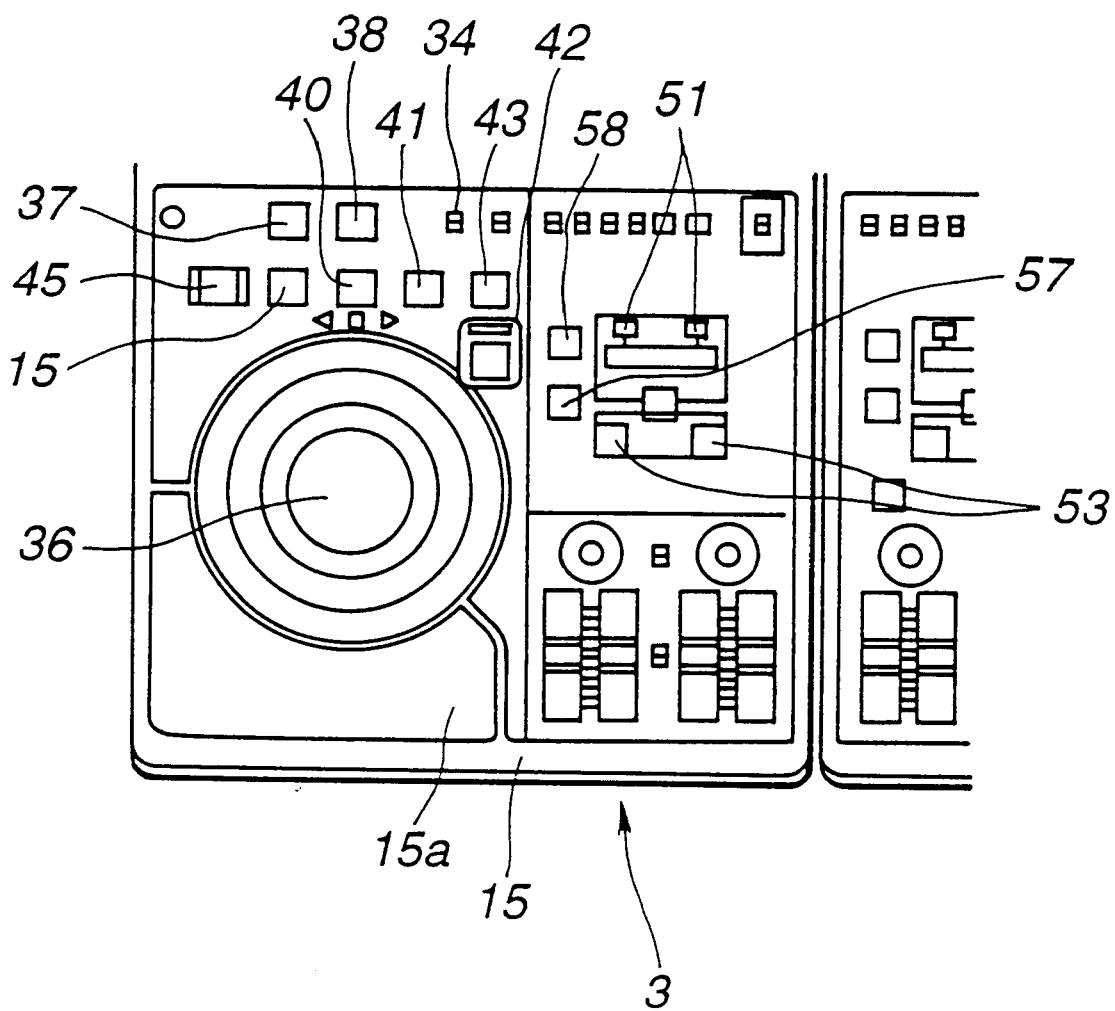
FIG. 11 is a plan view showing an operating panel of the portable video editing device placed on the player side.

Referring to FIGS. 10A and 11, the controller for the tape running system 30 includes a biaxial jog/shuttle dial 36, a PREROLL button 37, a REC (recording) button 38, an edit button 39, a play (playback) button 40, a FFWD (fast feed) button 41, a search button 42, a stop button 43, a rewind (REW) button 44, an eject button 45 and a player/recorder button 46. The eject button 45 ejects a tape cassette 4 in the video tape recorder 16. The player/recorder button 46 has a player button 46a and a recorder button 46b, such that, if the player button 46a is pressed, the operating buttons of the controller for the tape running system 30 and the editing operating unit 31 are set to the side of functioning for the camera-built-in type video tape recorder 1 and the portable video editing device 3 disposed on the player side, whereas, if the recorder button 46b is pressed, the operating buttons of the controller for the tape running system 30 and the editing operating unit 31 are set to the side of functioning for the portable video editing device 2 on the recorder side. Thus, the player/recorder button 46 is configured as playback object switching means for switching the control object of playback control means of the playback control means corresponding to the operating buttons of the controller for the tape running system 30 and the editing operating unit 31.

Referring to FIGS. 10A and 11, the editing operating unit 31 of the portable video editing devices 2, 3 includes an assemble button 49, an insert button 50, a trim (fine correction) button 51, an entry button 52, an IN/OUT (editing start/editing end point) button 53, a REVIEW button 54, an AUTOEDIT button 55, a preview button 56, a deletion button 57 and an AUDIOIN (audio editing start point designating) button 58, while there is no such button as 49, 50, 54, 55 or 56 on the side of the portable video editing device 3 on the player side.

(5) Explanation of the Video Editing Operation

Figure 12:
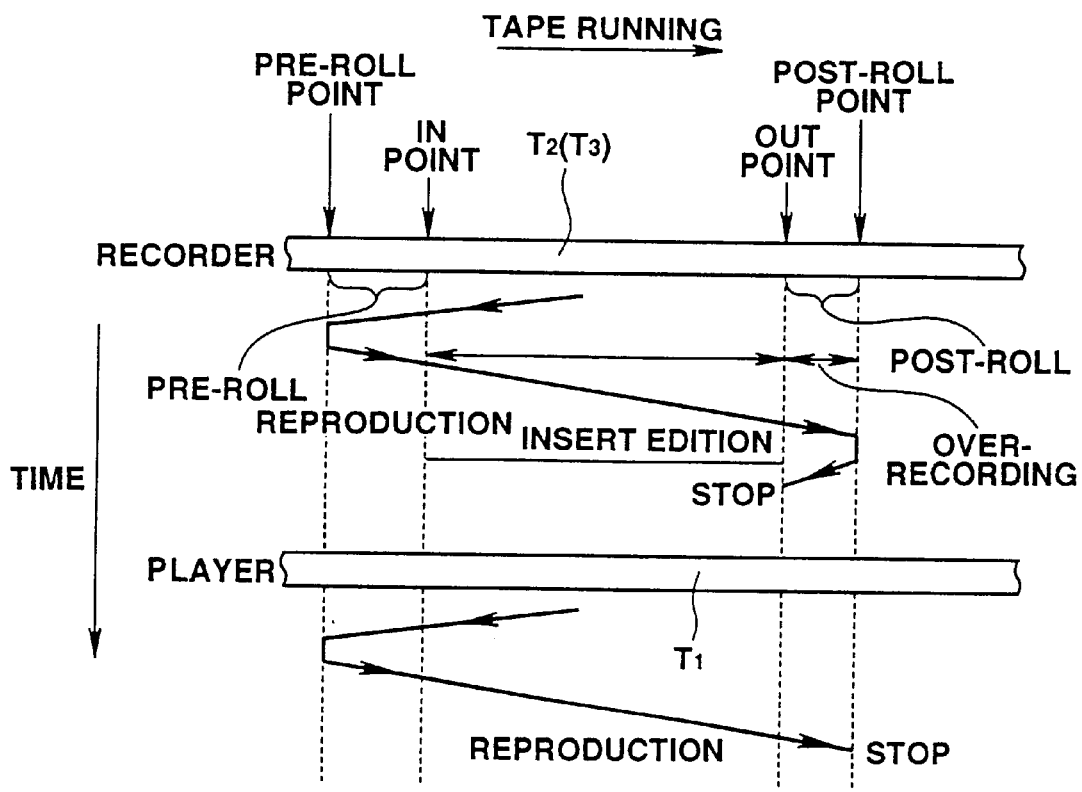
FIG. 12 illustrates schematics of the video editing operation carried out by the portable video editing device.

FIG. 12 illustrates schematics of the video editing operation which may be classified into an assemble editing for sequentially recording desired editing points of the recording contents (video/speech) of the original tape $T_1$, along with the time code, from the leading end of the new tape $T_2$ for broadcast, and an insert editing of inserting the desired editing sites of the recorded contents of the original tape $T_1$ in an optional portion of the of a recorded tape $T_3$ along with the time code. For this insert editing, there is used such a technique of exchanging the unneeded portion of the recorded tape $T_3$ with other pictures/speech, inserting music or narration into the tape $T_3$ having edited the picture, inserting a picture into the edited audio tape $T_3$ or rewriting the time codes.

During this video editing operation, the original tape $T_1$ is playback-controlled by the camera-built-in type video tape recorder 1 or the portable video editing device 3 as the player, and desired editing points of the playback picture/speech of the original tape $T_1$ are set, at the same time as the playback picture/speech is monitored by a LCD monitor 21 or the audio monitor speaker 26 of the portable video editing device 3 as the recorder. That is, the editing start point (point IN) and the editing end point (OUT point) are sequentially set and recorded on the original tape $T_1$, as the original tape $T_1$ is reproduced/halted repeatedly. When setting of all editing points of the playback picture/speech of the original tape $T_1$ has come to a close, the tape t1 is rewound and again reproduced, at the same time as the previously set editing points are sequentially recorded on the tape T1 ($T_3$) of the portable video editing device 2 operating as the recorder. If the AUTOEDIT (automatic editing) button 55 is thrust, the editing points between the point IN and OUT can be sequentially edited by automatic operation. For manual editing, an edit (EDIT) button 39 is pressed for sequentially editing the editing points between the point IN and OUT.

In connection with the video editing operation, there is provided a player/recorder (PLAYER/RECORDER) button 46 on the portable video editing device 2 as the recorder. If the player button 46a is thrust, the components of the tape running system 30 and the editing operating unit 31 controlled by the operating buttons of the controller are switched to those of the tape running system 30 and the editing operating unit 31 on the player side. Thus, the control of the tape running system and editing control on the player side can be conveniently executed by the operating buttons on the recorder side. The tape running control for locating the editing point is executed with the jog/shuttle mode/variable mode by the jog/shuttle dial 36. In the jog mode, −1 to +tuple speed reproduction is possible, whereas, in the shuttle mode, −24 to +24 tuple speed (21-step) reproduction is possible. In addition, in the variable mode, −1 to +1 tuple (47-step) reproduction is possible.

The setting and recording of the above-mentioned editing points (IN/OUT points) are carried out not only by pressing an IN/OUT button 53 but also by a push-pull operation of the jog dial.

Figure 13:
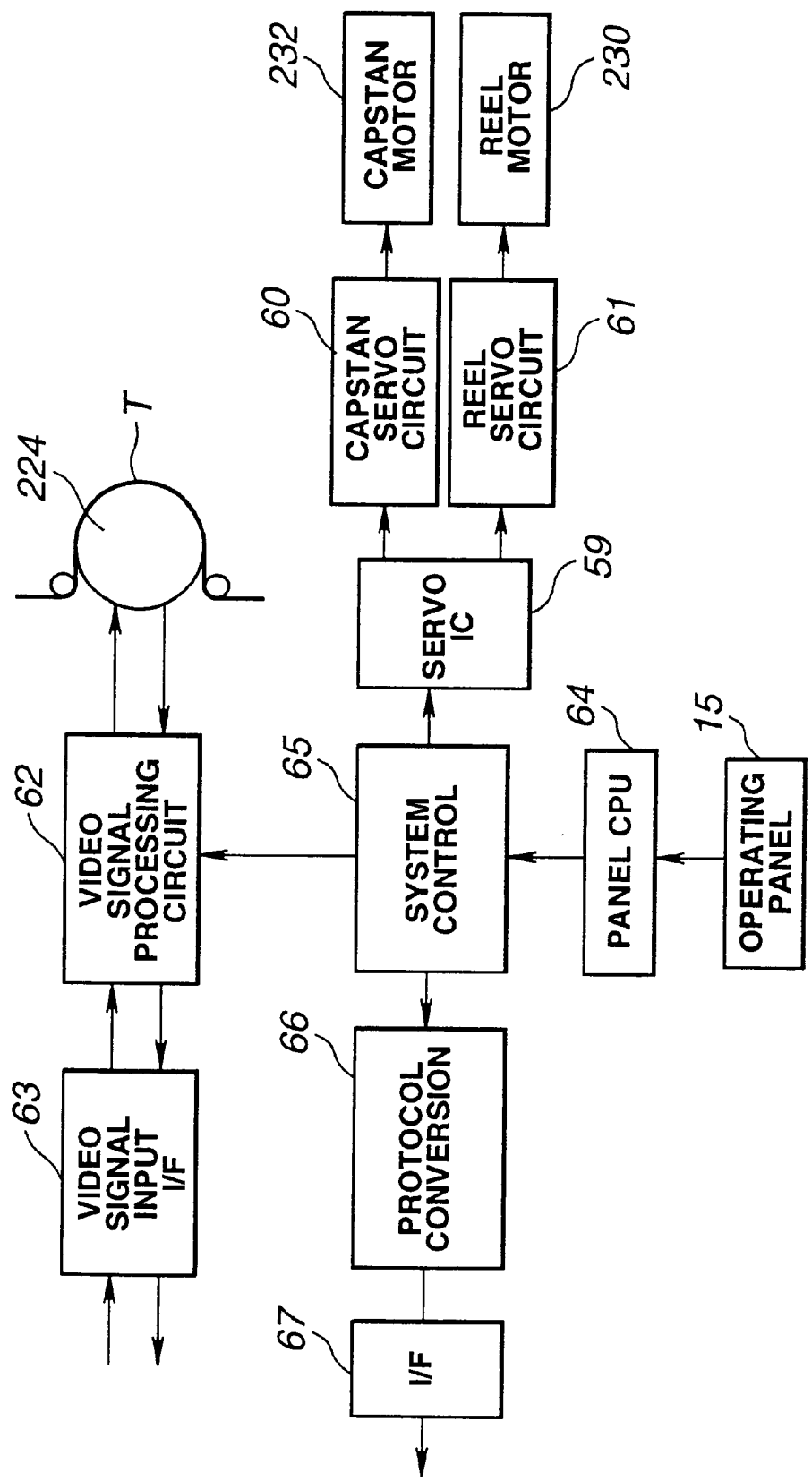
FIG. 13 is a block circuit diagram showing a control circuit for video editing in the portable video editing device.

FIG. 13 shows a control circuit for the portable video editing device 2 as the recorder. Various control signals from the operating panel 15 are entered via a panel CPU 64 to a system control circuit 65 which then outputs a remote control signal converted by a RS-422 protocol converter 66 to the camera-built-in type video tape recorder 1 or the portable video editing device 3, operating as a recorder, via an interface 67, for controlling the controller for the tape running system 30 and the editing operating unit 31 of the camera-built-in type video tape recorder 1 and the portable video editing device 3. On the other hand, the system control circuit 65 outputs capstan servo signals and reel servo signals to a capstan servo circuit 60 and a reel servo circuit 61 of the video tape recorder 16, via a servo IC 59 of the portable video editing device 2, to control the rotation of a capstan servo motor 232 and a reel motor 230 as well as a rotary head drum 224. The system control circuit 65 controls a video signal processing circuit 62,connected to a video signal input interface 62, in order to execute an editing operation of recording on the tape T1 ($T_3$) the editing points of the original tape T1 entered via interface 67 from the camera-built-in type video tape recorder 1 or the portable video editing device 3.

(6) Explanation of the Method for Interconnecting Two Video Editing Devices

Figure 14:
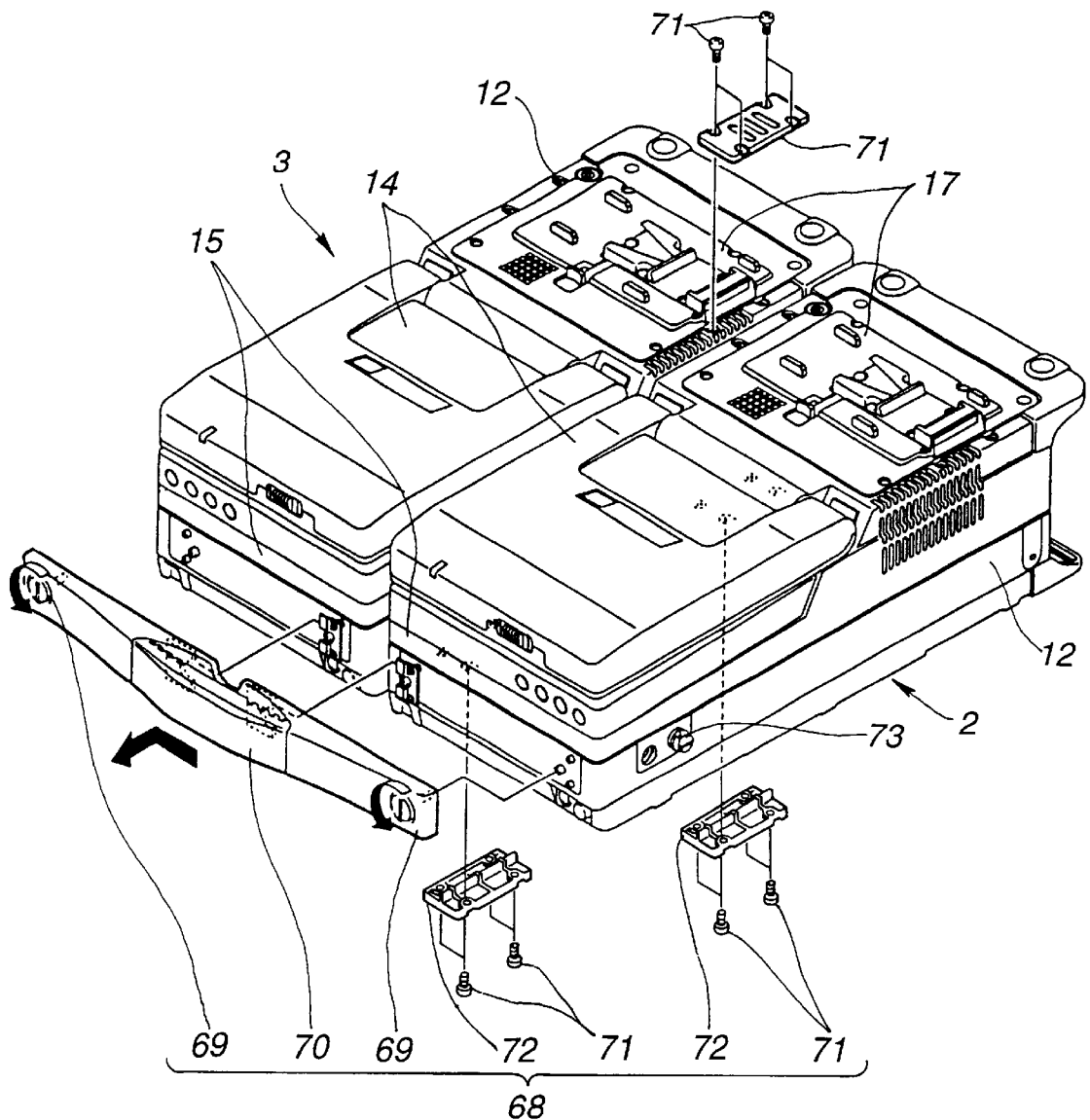
FIG. 14 is an exploded perspective view for illustrating connecting means for connecting carrying means and coupling means for the portable video editing device.

FIGS. 5A, 6 and 14 show coupling means 68 interconnecting two portable video editing devices 2, 3 side-by-side in the left-and-right direction. The coupling means 68 is made up of a carrying handle 70 detachably mounted astride the front end faces of the two portable video editing devices 2, 3 by a pair of coil springs 69 and plural connecting plates 72 detachably mounted on the lower and upper surfaces of the two portable video editing devices 2, 3 by four set screws 71. The two portable video editing devices 2, 3, thus coupled together, can be carried by manually holding a carrier handle 70. A shoulder belt, not shown, detachably affixed to the two portable video editing devices 2, 3 for transporting the two portable video editing devices 2, 3 separately or in the interconnected state, can be detachably mounted on shoulder belt mounting hooks 73 detachably mounted on left and right lateral sides on the forward ends of the portable video editing devices 2, 3.

Figure 15B:
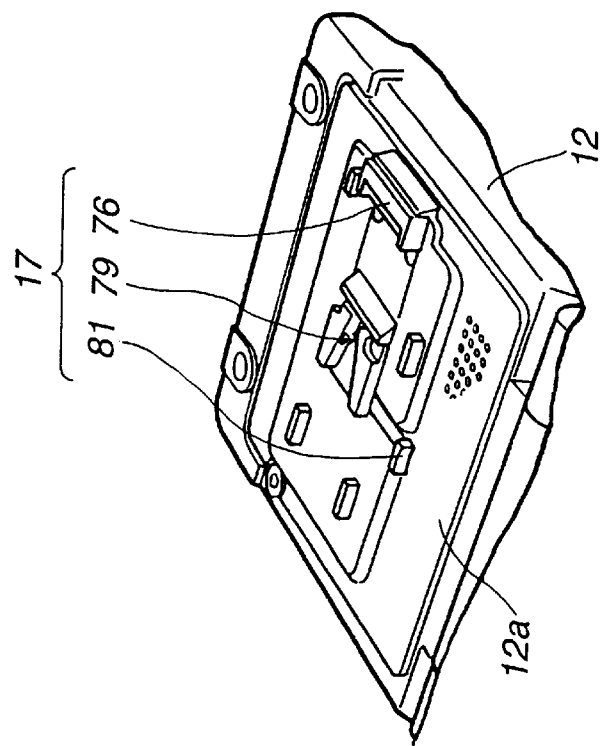
FIGS. 15A–15B are a perspective view showing a battery loading unit of the portable video editing device.
Figure 15A:
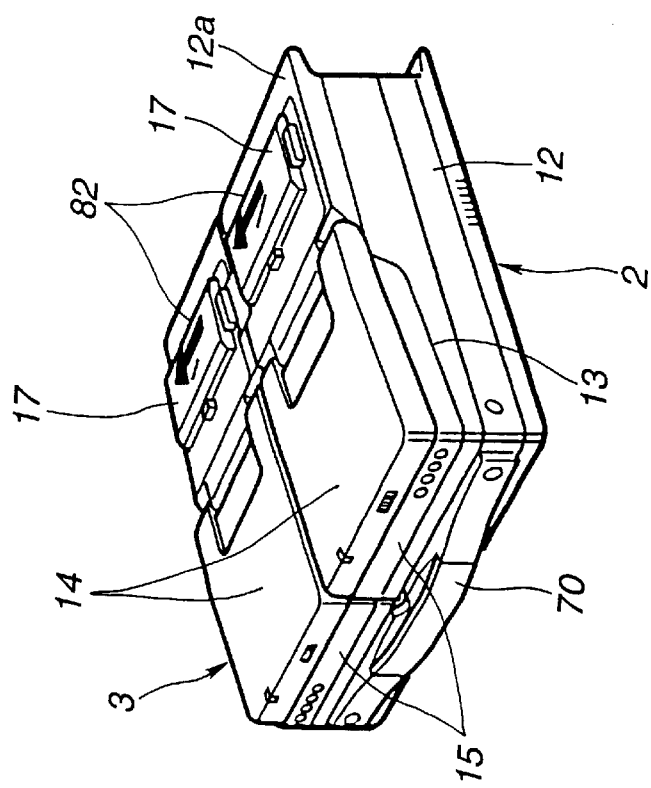
Figure 16:
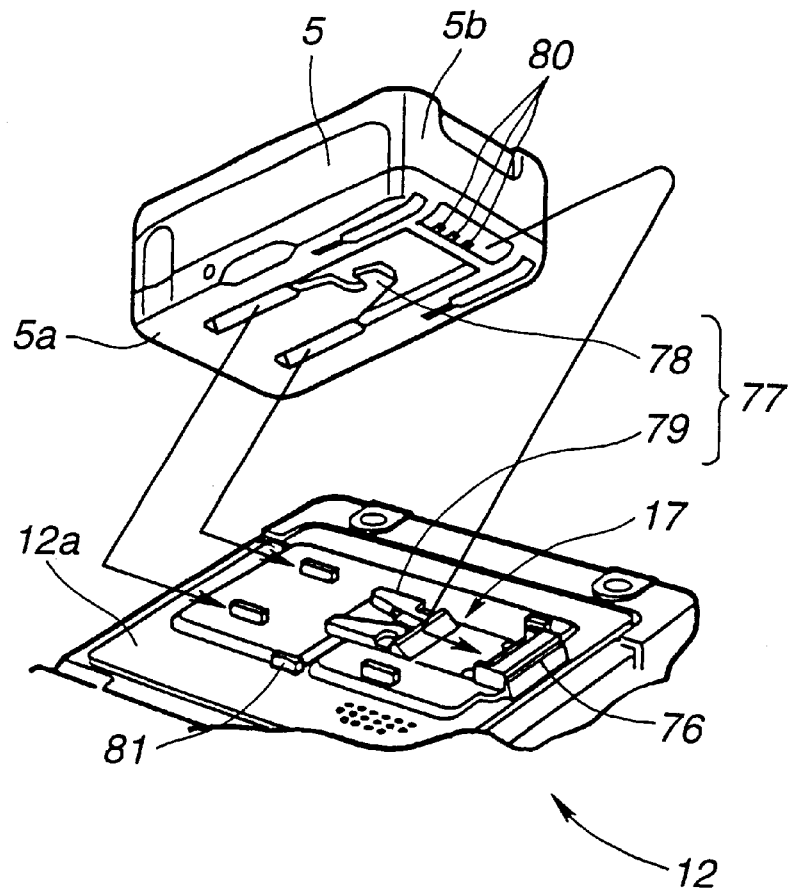
FIG. 16 is an exploded perspective view showing the mounting/dismounting structure of the battery loading unit.
Figure 17:
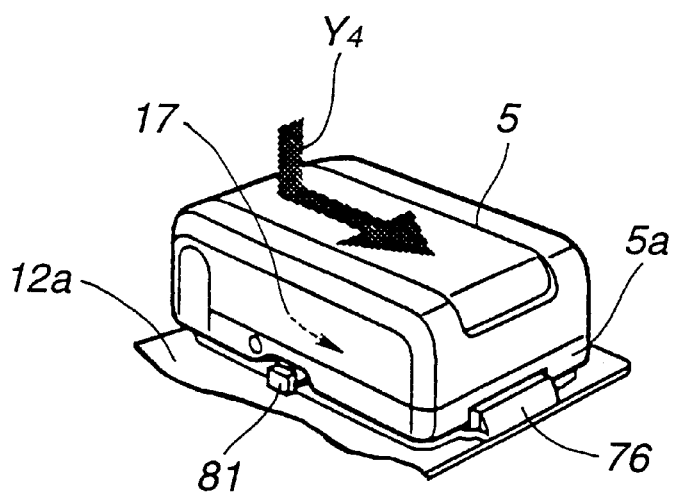
FIG. 17 is a perspective view showing the state in which a battery has been mounted on the battery mounting portion.

(7) Detailed Explanation of the Battery Attachment Section of the Portable Video Editing Devices Next, referring to FIGS. 15 to 17, a battery terminal 76 and a battery attachment/detachment unit 77 are mounted in a battery attachment section 17 of each of the twp portable video editing devices 2, 3. This battery attachment/detachment unit 77 is designed so that, by a dovetail structure by mating projections 78 and grooves 79 defined in the unit 77 and in a lateral surface 5a of the battery 5, the battery 5 set on the battery attachment section 17 is slid in a direction indicated by arrow y4 in FIG. 17, for detachably engaging the mating projections 78 in grooves 79 and for detachably connecting plural terminal pins 80 provided on an end face 5b of the battery 5 to a battery terminal 76 for automatically locking the battery 5 on the battery terminal 76. An unlock lever 81 provided on a lateral surface of the battery attachment section 17 is thrust in a direction indicated by arrow y4 for unlocking the battery 5. The battery 5 is then moved in an opposite direction to the direction of arrow y4 from above the battery attachment section 17 for detaching the battery 5. A similar battery attachment section 17 is attached to the rear end face of the camera-built-in type video tape recorder 1 so that the common battery 5 can be used in common by the camera-built-in type video tape recorder 1 and the two portable video editing devices 2, 3. During non-use, such as when transporting the portable video editing devices 2, 3, a cover 82 is detachably mounted on the battery attachment section 17, as shown in FIG. 15.

Figure 18:
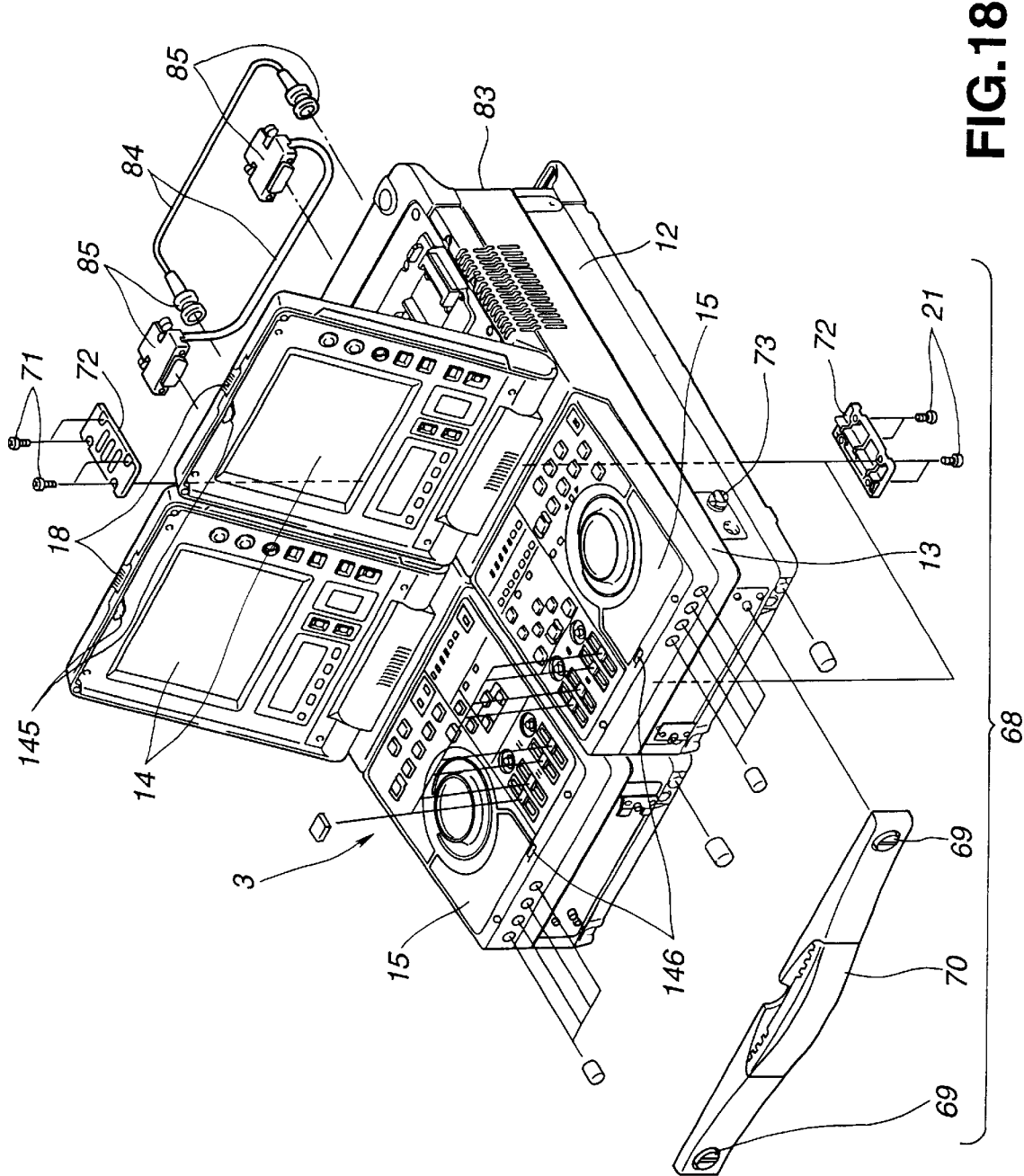
FIG. 18 is a perspective view showing two of the above portable video editing devices electrically interconnected by a connection cord.
Figures 19A, 19B:
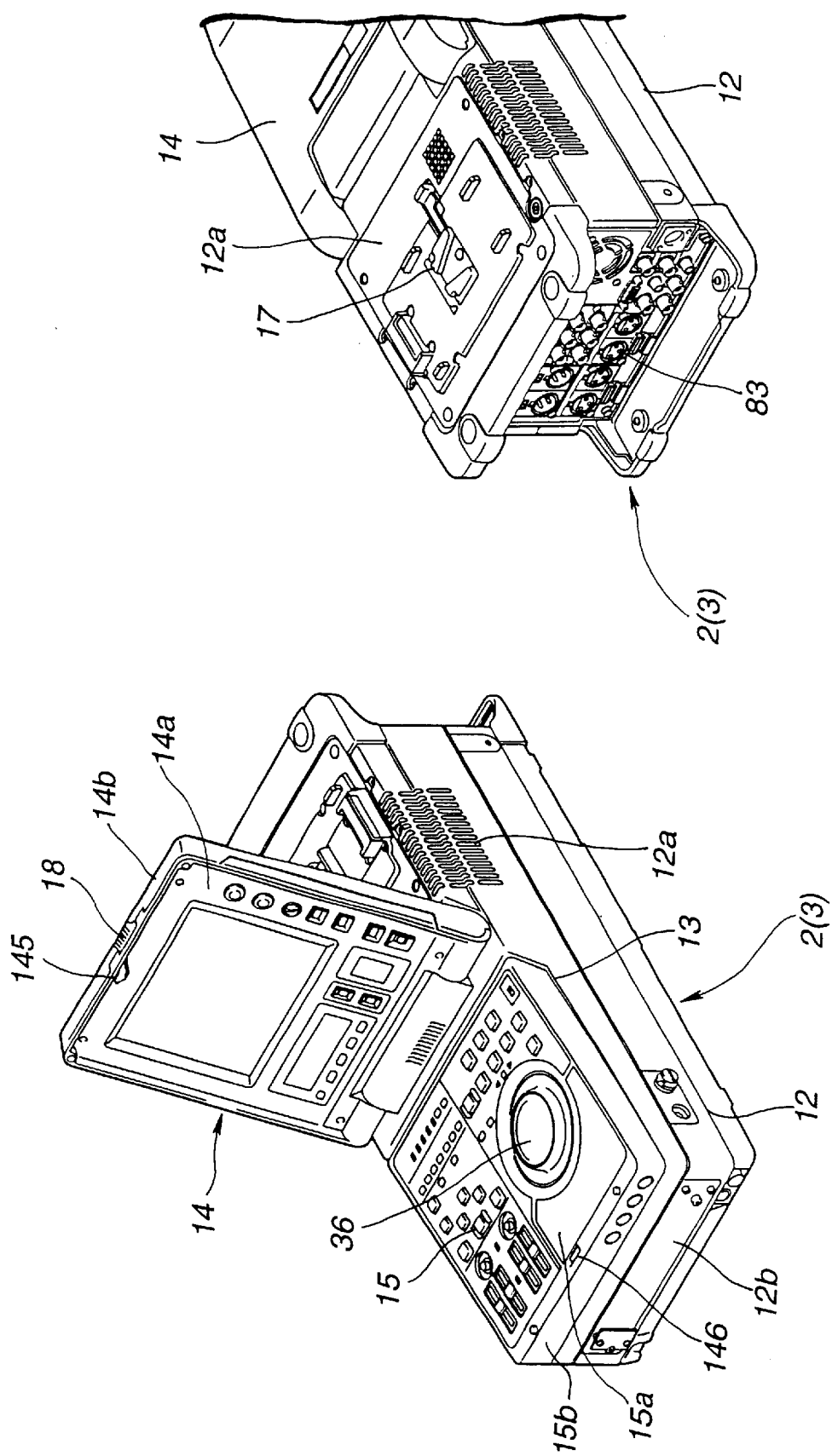
FIGS. 19A–19B are a perspective view showing the portable video editing device and its connection portion.
Figure 20:
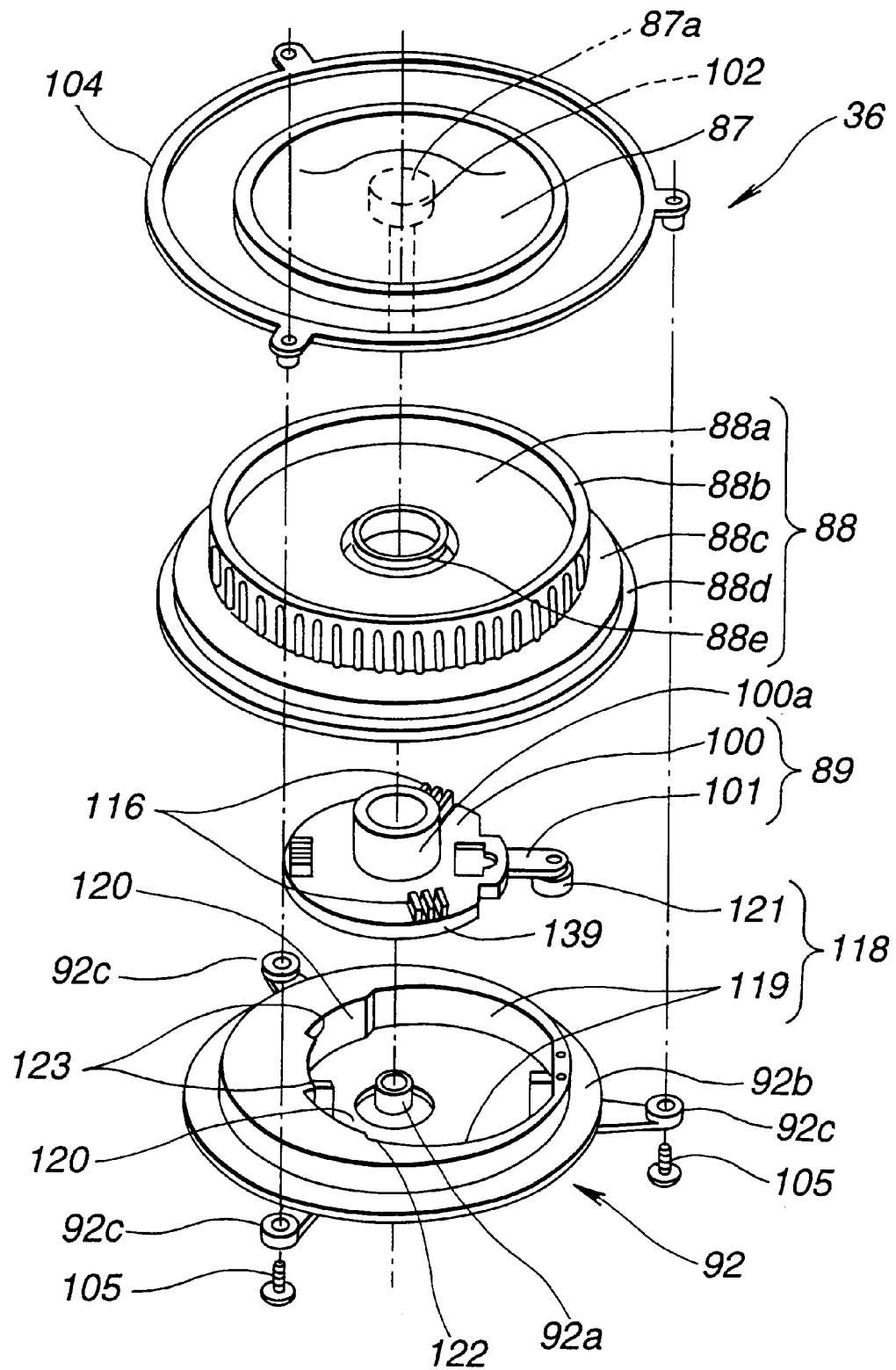
FIG. 20 is an exploded perspective view showing a jog/shuttle dial of the portable type video editing device.

Referring to FIGS. 18, 19A and 19B, the two portable video editing devices 2, 3 are interconnected between connector panels 83 formed on the rear end faces of the two portable video editing devices 2, 3 by a cable cord 84 and a connector 85. For these cables 84, an RS-422 cable is used for resetting control.

(8) Explanation of Jog/Shuttle Dial

Referring to FIGS. 20 to 25, a jog/shuttle dial 36, equivalent to a biaxial controller, includes a jog dial 87 corresponding to an inner dial and jog control means, and a shuttle dial 88 corresponding to an outer dial and shuttle control means. A reset rotor 89, equivalent to resetting means, is assembled to a lower inner rim of the shuttle dial 88.

On an upper portion of a operating panel chassis 90 of a metal plate, constituting the lower surface of the operating panel 15, a circuit board 91 constituted by a double-sided printed circuit board and a dial holder 92 formed of synthetic resin are attached horizontally in an upper layer and a lower layer by plural set screws 93, 94. A dial shaft 95 is passed in a perpendicular direction through a bearing 92*a* molded as one on a central upper portion of the dial holder 92. This dial shaft 95 is rotatable in the directions $a_1$, $a_2$ corresponding to the circumferential direction with respect to the dial holder 92, while being movable in the axial direction as indicated by arrows $b_1$, $b_2$ (in the up-and-down direction). On the upper end of the dial shaft 95, a jog dial 87 formed of molded synthetic resin is horizontally press-fitted by a bearing 87*a* molded as one with the lower mid portion. A rotation detection plate 96 is horizontally secured by set screws 97 and by adhesion to the lower end of the dial shaft 95. This rotation detection plate 96 is arranged below the circuit board 91. The jog dial 87 and the rotation detection plate 96 are rotatable as-one via dial shaft 95 in the direction indicated by arrows $a_1$, $a_2$ while being movable in the directions of arrows $b_1$, $b_2$. The rotation detection plate 96 is designed to have a pressure contact from below with a friction plate 98 of e.g., felt, bonded to the lower mid surface of the dial holder 92.

The reset rotor 89 is made up of a main body portion 100 of the reset rotor, formed of e.g., synthetic resin, and a rotor slider 101 fabricated by a metal plate. The main body portion 100 of the reset rotor 89 is inserted by a bearing 100*a* formed as-one with the upper mid portion of the main body portion 100 on the outer rim of the dial shaft 95 at an outer rim of the dial shaft 95. Between these two bearings 87*a*, 100*a* are fitted two radial bearings 102. Thus, the reset rotor 89 can rotate the radial bearing 102*a* relative to the jog dial 87 in the direction indicated by arrows $a_1$, $a_2$. On the other hand, the reset rotor 87 is designed to be moved in the direction of arrows $b_1$, $b_2$ as-one with the jog dial 87.

The shuttle dial 88 is molded of synthetic resin, and includes a horizontal disc portion 88*a*, a rotation knob 88*b* which is a ring-shaped rib molded as-one with the upper outer rim of the disc portion 88*a*, an outer peripheral flange 88*d* molded as-one concentrically via a step 88*c* on the outer lower rim from the rotation knob 88*b* and a bearing 88*e* molded as-one with the mid portion of the disc portion 88*a*. The shuttle dial 88 is loosely fitted on the outer rim of the bearing 100*a* at an upper portion of the main body portion 100 of the reset rotor 89 by a bearing 88*e* for relative rotation in the directions of arrows $a_1$, $a_2$ and for relative movement in the directions of arrows $b_1$, $b_2$. Thus, the disc portion 88*a* of the shuttle dial 88 is horizontally arranged between the jog dial 87 and the reset rotor 89, with the jog dial 87 having a loose fit inwardly of the rotation knob 88*b* of the shuttle dial 88. The friction plate 103 of felt or the like, bonded to the lower surface of the step 88*c* of the jog dial 88, is horizontally set on the outer peripheral flange 92*b* molded concentrically as-one with the outer rim of the dial holder 92. On upper portions of three arms 92*c* molded as-one with outer rim portions of an outer peripheral flange 92*b* of the dial holder 92 are horizontally secured retainer rings 104 by three set screws 105. The upper portions of the friction plate 106, such as felt plate, horizontally secured to an upper portion of the outer peripheral flange 88*d* of the shuttle dial 88, are pressed towards below by this retainer ring 104.

On the outer rim of the bearing 88*e* of the shuttle dial 88 is inserted an initially compressively stressed compression coil spring 108 of a strong spring force via a slip ring 109 between the jog dial 87 and the shuttle dial 88. On the inner rim of the lower end of the bearing 100*a* of the main body portion 100 of the reset rotor 89 are fitted a thrust bearing 110 an a washer 111. On the outer rim of the bearing 92*a* of the dial holder 92 is inserted an initially compressively stressed compression coil spring 108 of a weak spring force between the bearing 92*a* and the washer 111.

Thus, the jog dial 87 is biased by the spring force of the two compression coil springs 108, 112 in a direction of arrow $b_1$ which is an upward direction relative to the shuttle dial 88. There is provided connection means 114 that is connectable and releasable from the direction of arrows $b_1$ and $b_2$ between the shuttle dial 88 and the main body portion 100 of the reset rotor 89 biased in the upward direction as indicated by arrow $b_1$ as-one with the jog dial 87. This connection means 114 is constituted by a ring gear 115, formed concentrically as one with the lower surface of the disc portion 88*a* of the shuttle dial 88, and three partial gears 116 molded concentrically as-one with the upper surface of the main body portion 100.

There is assembled between the inner rim of the step 88*c* of the shuttle dial 88 and the inner rim of the dial holder 92 rotation restoration means 118 for automatically rotationally restoring the reset rotor 89 from an optional rotational position to the reset position $P_1$ when the connection of the connection means 114 is released. The rotation restoration means 118 is constituted by two-step cams 119, 120 formed on the inner rim of the dial holder 92 and a cam follower roll 121 formed by a bearing mounted on the lower distal end of a rotor slider 101 of the reset rotor 89. The two-step cams 119, 120 are arranged in left-and-right symmetry relative to the reset position $P_1$ and are designed as offset cams progressively reduced in radius along two rotational directions (arrow $a_1$ direction) away from the reset position $P_1$. Between these cams 119, 120 is formed a step portion 122 and a stop 123 for the cam follower roll 121 is formed at the terminal end of the cam 120.

On the lower surface of the main body portion 100 of the reset rotor 89, a rotor slider 101 is mounted for being slid b ya guide mechanism in the direction of arrows $c_1$, $c_2$ which is a direction perpendicular to the dial shaft 95. This guide mechanism is made up of two flanged guide pins 124 and two parallel guide grooves 125. Between paired spring retainers 126, 127 formed by the main body portion 100 and the rotor slider 101 are horizontally mounted two tension coil springs 128 in the initially tensile stressed state as biasing means extending parallel to each other. The rotor slider 101 is slid in the direction indicated by arrow $c_1$ relative to the main body portion 100 by these tension coil springs 128 for pressing the cams 119, 120 by the cam follower roll 121 relative to the cams 119, 120 from the direction indicated by arrow $c_1$. In a mid portion of the rotor slider 101 is formed a clearance hole 129 for the dial shaft 95 and the compression coil spring 112.

A rotational position detection means 131 for the jog dial 87 is made up of a FG pattern 132, concentrically formed by seal bonding to the outer rim of the upper surface of the rotation detection plate 96, and two light-reflecting type photocouplers 133 mounted on the lower surface of the circuit board 91. A rotational position detection means 134 of the shuttle dial 88 is made up of a FG pattern 135 formed concentrically by seal bonding to the lower surface of the outer peripheral flange portion 88d of the shuttle dial 88 and two light-reflecting type photocouplers 136 mounted on the upper surface of the circuit board 91.

A lowering detection means 137 for detecting the lowering of the jog dial 87 as indicated by arrow $b_2$ is made up of a light-transmitting photocoupler 138 mounted on the upper surface of the circuit board 91 and a rib for light shutter 139 molded as-one concentrically on the lower outer rim of the main body portion 100 of the reset rotor 89. A positioning means 140 for positioning the reset rotor 89 at the reset position $P_1$ is made up of two detection pins 141 for current conduction mounted perpendicularly on the circuit board 91 and a cam follower roll 121 of metal. When the reset rotor 89 is restored to the reset position $P_1$ so that the cam follower roll 121 is positioned between the two detection pins 141, these two detection pins 141 are shorted by the cam follower roll 121 for detecting the reset position $P_1$ of the reset rotor 89.

Figure 21:
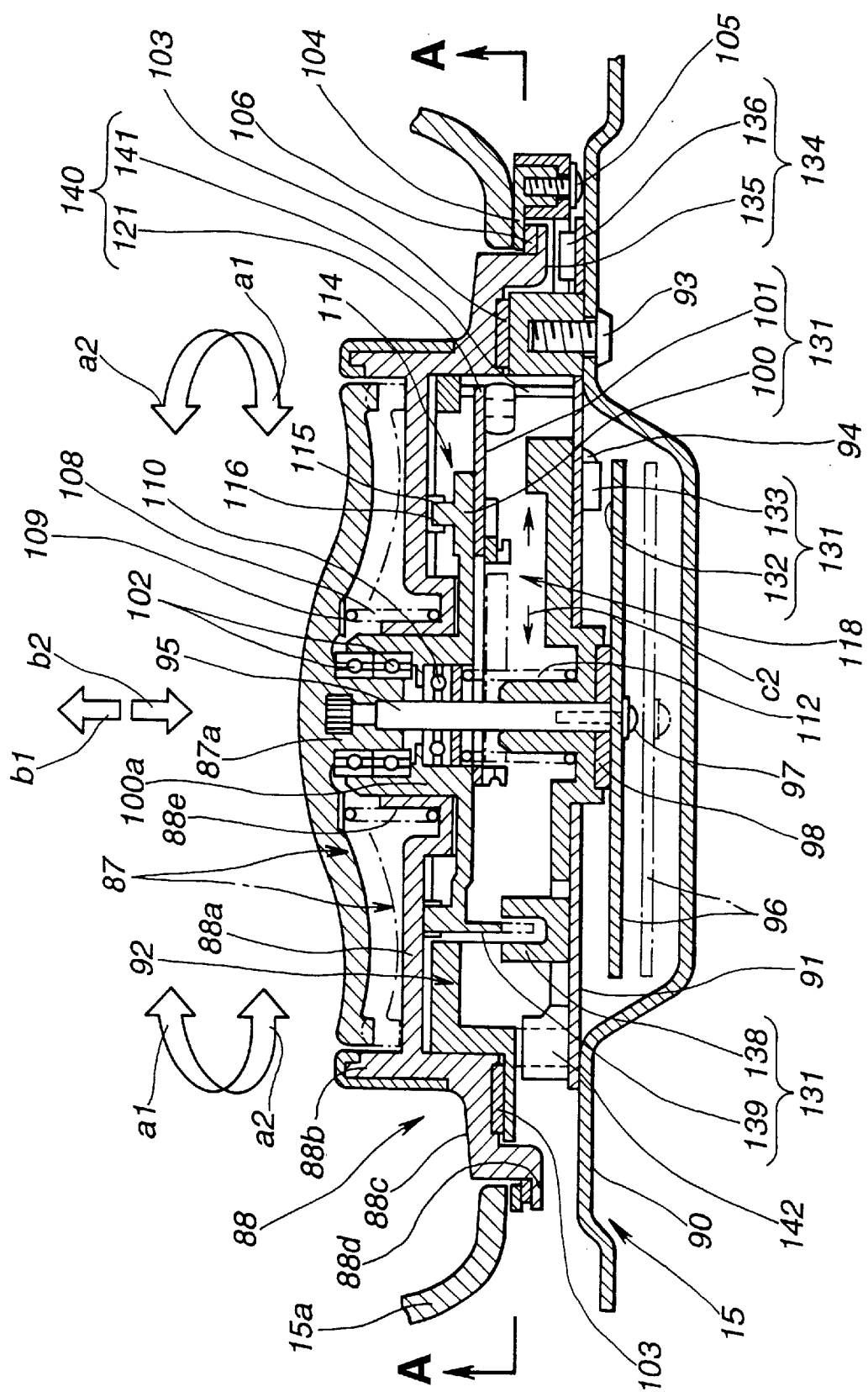
FIG. 21 is a cross-sectional view showing the use state of the jog/shuttle dial.

In the above-described structure of the jog/shuttle dial 87, the jog dial 87 is raised in the direction of arrow $b_1$ to a raised position indicated by solid line in FIG. 21 under the force of the two compression coil springs 108, 112. At this time, the rotation detection plate 96 is pressed against the friction plate 98 from the direction indicated by arrow $b_1$, at the same time as the partial gear 116 of the reset rotor 89 is engaged from the direction of arrow $b_1$ with the ring gear 115 of the shuttle dial 88 of the connection means 114 for coupling the reset rotor 89 with the shuttle dial 88. The friction plate 103 of the shuttle dial 88 is pressed against the outer flange 92b of the dial holder 92 from the direction of arrow $b_2$ under the force of the compression coil spring 108 of a strong spring force.

Thus, the jog dial 87 is configured for being stopped at an optional rotational position by the frictional torque produced by the friction plate 98. The shuttle dial 88 is configured for being stopped at an optional rotational position by the frictional torque produced by the friction plate 103.

Transition from the modes of PLAY, FF or jog mode to the shuttle mode occurs by forward and reverse rotation of the shuttle dial 88, while transition from the modes of PLAY, FF or jog mode to the shuttle mode occurs by forward and reverse rotation of the jog dial 87. However, this transition to the jog mode occurs only when the shuttle mode is reset. This resetting to the shuttle mode occurs by lightly manually pressing down the jog dial 87 from the upper position shown by a solid line in FIG. 21 to the lowered position indicated by a chain-dotted line in FIG. 21.

By manually rotating the jog dial 87 in the forward direction and in reverse as indicated by arrows $a_1$ and $a_2$, the rotational position of the jog dial 87 is detected by the rotational position detection means 131 such that reproduction occurs at a −1 to +1 tuple speed. If the hand is released from the jog dial 87 at an optional rotational position, the jog dial 87 is stopped at this position.

Figure 22:
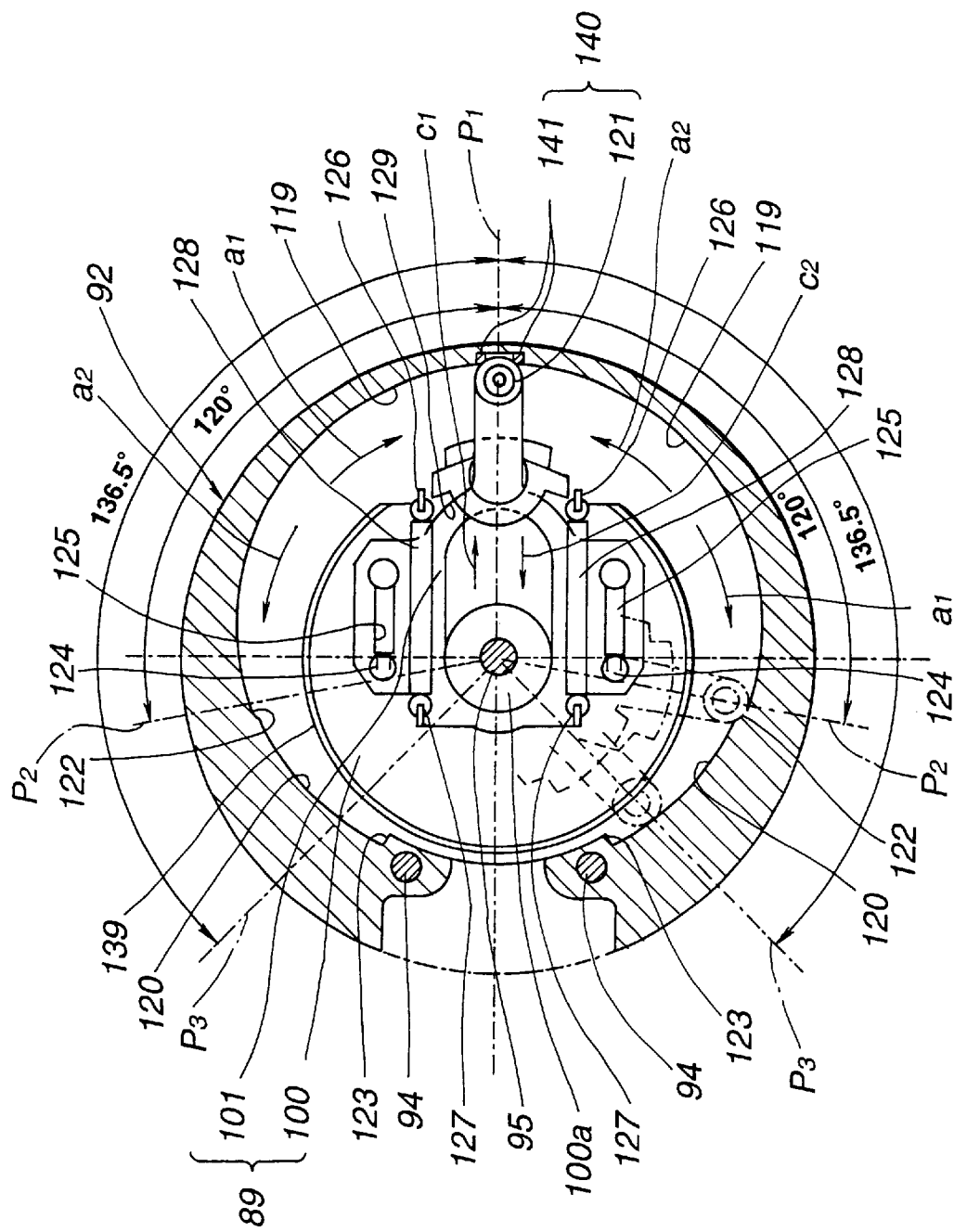
FIG. 22 is a bottom plan view showing a reset rotor in the jog/shuttle dial, taken along line A—A in FIG. 21, with a portion thereof being broken away.
Figure 23:
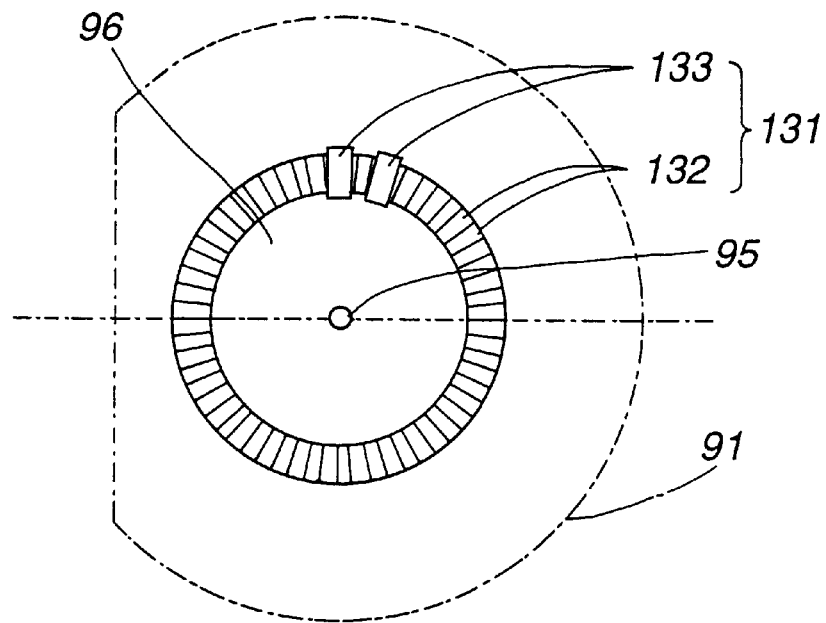
FIG. 23 is a plan view showing jog rotation detection means in the jog/shuttle dial.
Figure 24:
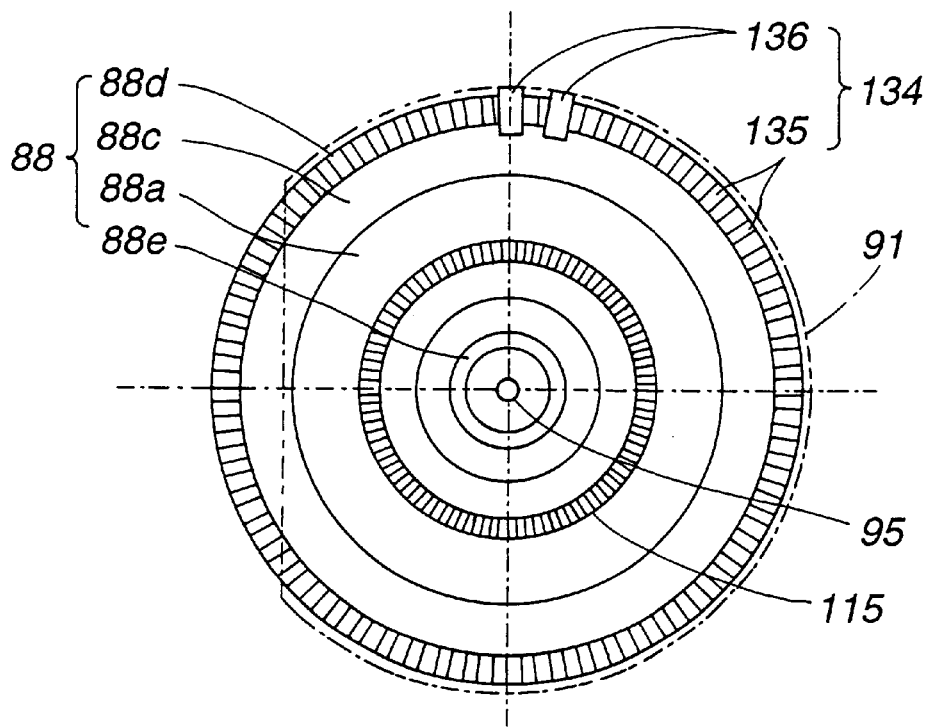
FIG. 24 is a plan view showing jog dial rotation detection means in the jog dial.
Figure 25:
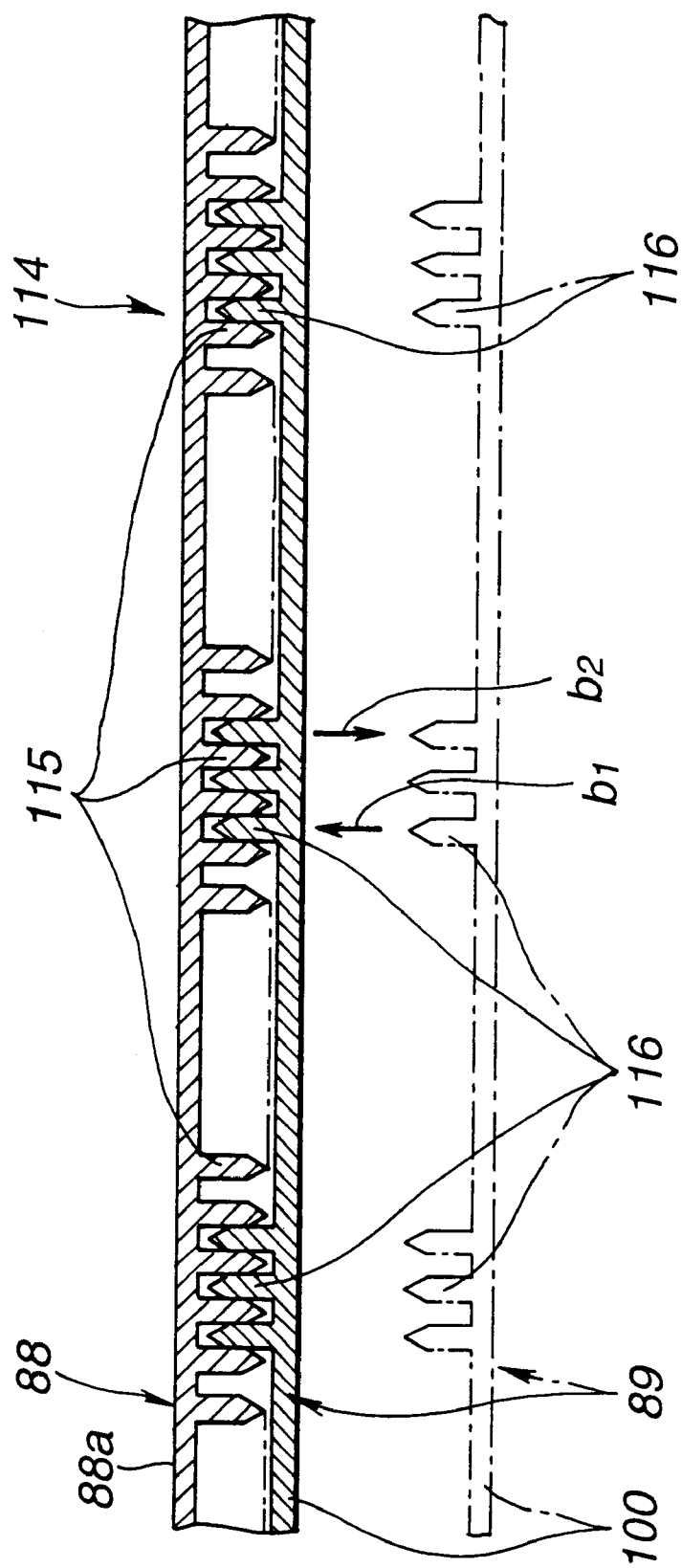
FIG. 25 is a developed cross-sectional view showing the shuttle dial and the rotor connection gear in the jog/shuttle dial.

The shuttle dial 88 is then manually rotated in the forward direction and in reverse as indicated by arrows $a_1$ and $a_2$, whereby the rotational position detection means 134 detects the rotational position of the shuttle dial 88 such that reproduction occurs at −24 to +24 tuple speed. The rotational position $P_2$ in FIG. 22 is set to ±5 tuple speed, while the rotational position $P_3$ is set to ±24 tuple speed. If the hand is released from the shuttle dial 88 at an optional rotational position, the shuttle dial 88 is stopped at this optional rotational position.

The state in which the reset rotor 89 coupled to the shuttle dial 88 by the connection means 114 is positioned at the reset position $P_1$ is the reset state in the shuttle mode. If the shuttle dial 88 is rotated in the forward direction and in reverse as indicated by arrows $a_1$, and $a_2$, the reset rotor 89 also is rotated in the forward direction and in reverse in unison with the shuttle dial 88. The cam follower roll 121 of the rotation resetting means 118 is rotated from the reset position printing paper sheet 1 towards the cams 119, 120. The cam follower roll 121 is progressively receded in the direction of arrow $c_2$ by the cams 119, 120 against the force of the two tension coil springs 128. The repulsive force of the two tension coil springs 128 is increased progressively such that the rotational load of the shuttle dial 88 afforded by the repulsive force is increased progressively. That is, rotation of the shuttle dial 88 is loaded progressively. If, at the ±5 tuple speed, the cam follower roll 121 rides past the stop 112 to shift from the cam 119 towards the cam 120, the rotational load on the shuttle dial 88 is increased at the time point of riding past the step 122. This gives the user the feeling of the critical point of ±5 to ±24 tuple speed by his or her ductile sense. If the shuttle dial 88 is rotated to the maximum rotational angle, the cam follower roll 121 compresses against the stop 123 so that rotation of the shuttle dial 88 ceases. If, with the shuttle dial 88 rotated to an optional rotational angle, the jog dial 87 is manually pressed down as indicated by arrow $b_2$ as far as the lowered position indicated by chain-dotted line in FIG. 21, the rib 139 for light shutter is inserted from the direction of arrow $b_2$ into the photocoupler 138 to permit the lowering of the jog dial 87 to be detected by the lowering detection means 137.

If the jog dial 87 is pressed down as indicated by arrow $b_2$, the reset rotor 87 also is lowered along with the jog dial 87, such that the partial gear 116 is disengaged from the ring gear 115 of the connection means 114 in a direction indicated by arrow $b_2$. At this time instant, the reset rotor 89 is automatically rotationally restored from the optional rotational position to the reset position $P_1$ as indicated by arrows $a_2$, $a_1$, by the function of restoration of the cam follower roll 121 by the cams 119, 120 of the rotation restoration means 118. This function of restoration is brought about by the rotational moment by the component force of the pressuring force of pressing the cam follower roll 121 against the cams 119, 120 by the two tension coil springs 128 from the direction of arrow $c_1$. The cam follower roll 121 is positioned between the two detection pins 141 and the reset rotor 89 is stopped at the reset position $P_1$, at the same time as the restoration to the reset position $P_1$ is detected by the two detection pins 141.

Thus, with the present jog/shuttle dial 36, the shuttle mode can be instantaneously reset by the lowering detection means 137 simply by manually lightly pressing down the jog dial 87 without the necessity of returning the shuttle dial 88 from the optional rotational position to the reset position $P_1$. If the first lowering operation of the jog dial 87 in the shuttle mode is detected by the lowering detection means 137, the mode is the shuttle mode resetting mode. If the second and the following lowering operations of the jog dial 87 are detected by the lowering detection means 137, the second and the following lowering operations represent the operations for determining the above-mentioned editing points, that is the IN and OUT points. Therefore, the editing points, that is the IN and OUT points, can be determined quickly by the lowering operation of the jog dial 87, as the editing points are searched by controlling the playback speed by the jog dial 87 or the shuttle dial 88 during the video editing operations.

Figure 26:
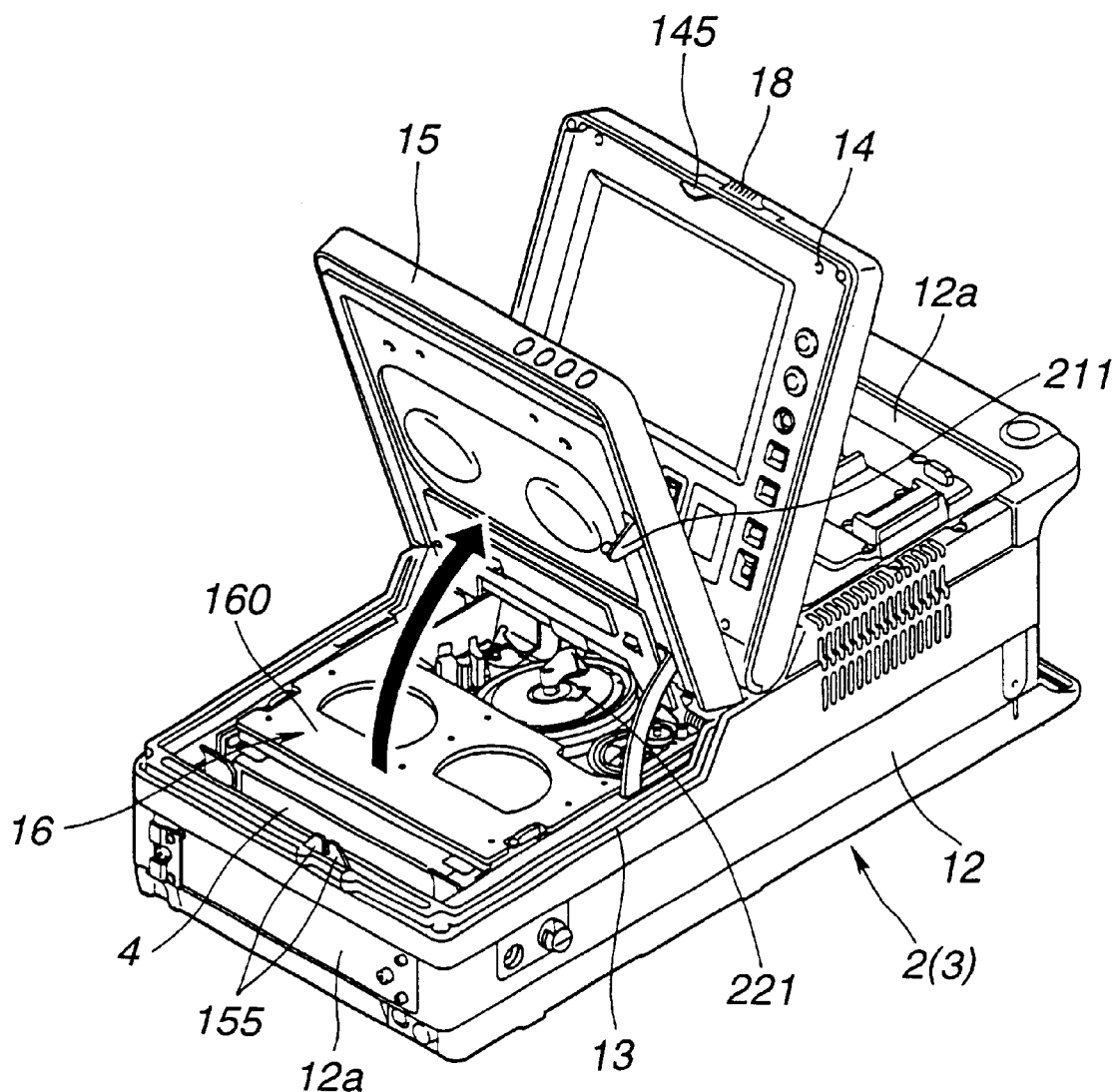
FIG. 26 is a perspective view showing the operating panel opened state of the portable video editing device.
Figure 27:
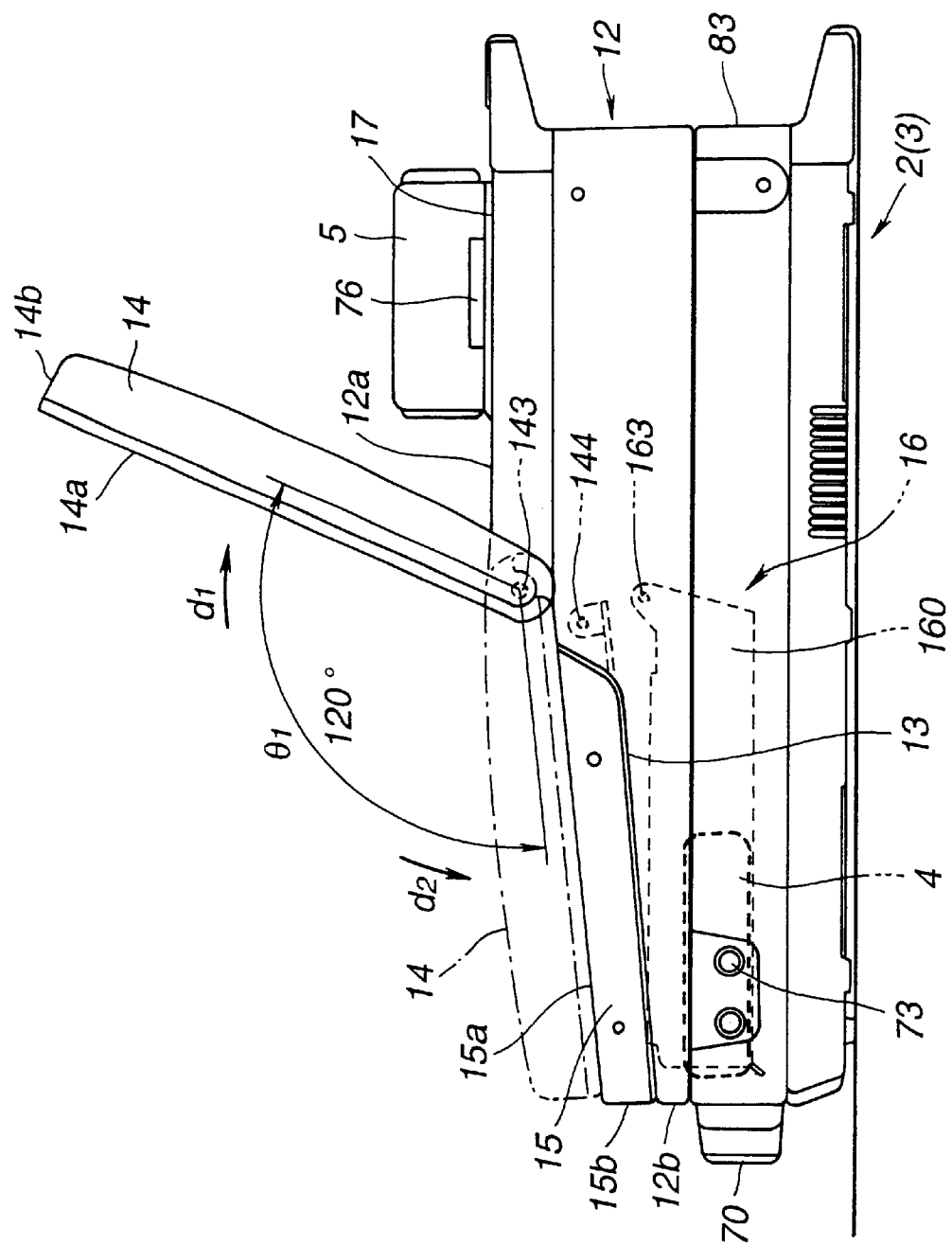
FIG. 27 is a side view showing a cassette compartment in the down-state with the display panel of the portable video editing device being opened.
Figure 28:
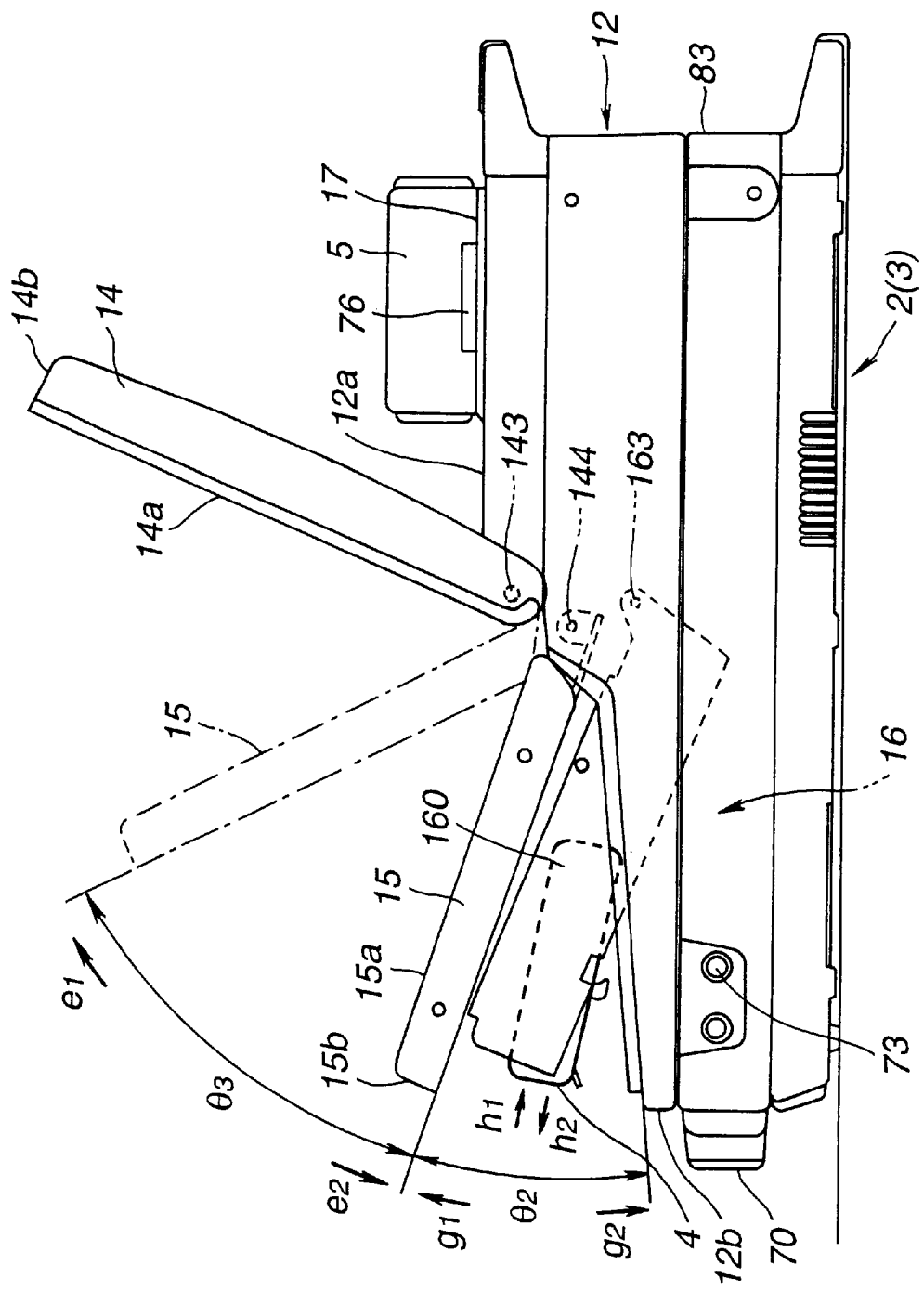
FIG. 28 is a side view showing the cassette compartment in the portable video editing device in the popped-up state.

(9) Explanation of the Opening/Closure Operation of the Display Panel and the Operating Panel Referring to FIGS. 26 to 28, the display panel 14 and the operating panel 15 are mounted for rotation in the up-and-down direction with respect to the main body portion of the video editing device 12, as indicated by arrows $d_1$, $d_2$ and $e_1$, $e_2$, by left and right paired rotational fulcrum points 143, 144. The display panel 14 is configured for being opened and closed at a rotational angle $\theta_1$ of approximately 120° between the closure position indicated by chain-dotted line and the opened position indicated by a solid line in FIG. 27. The operating panel 15 is configured by a two-step opening/closure mechanism such that the operating panel 15 can be opened and closed at a rotational angle $\theta_2$ between the solid-line opened position in FIG. 27 and the opened position for cassette ejection indicated by the solid line in FIG. 18, while it can further be opened and closed at a rotational angle $\theta_3$ from the opened position for cassette ejection as far as the opened position for maintenance which is further upward from the opened position for cassette ejection. If the display panel 14 is rotated in the direction indicated by arrow $d_2$ as far as the closure position indicated by chain-dotted line in FIG. 27 for locking, such locking may be realized by inserting a lock pawl 145 mounted on an end towards the front end face 14b of the front surface 14a of the display panel 14 into a lock hole 146 formed in the end portion towards the front end face 15b of the upper surface 15a of the operating panel 15. The unlock knob 18 mounted on the front end face 14b of the display panel 14 is configured for unlocking the display panel 14 by unidirectionally sliding the lock pawl 145 in the lock hole 146.

Figure 29:
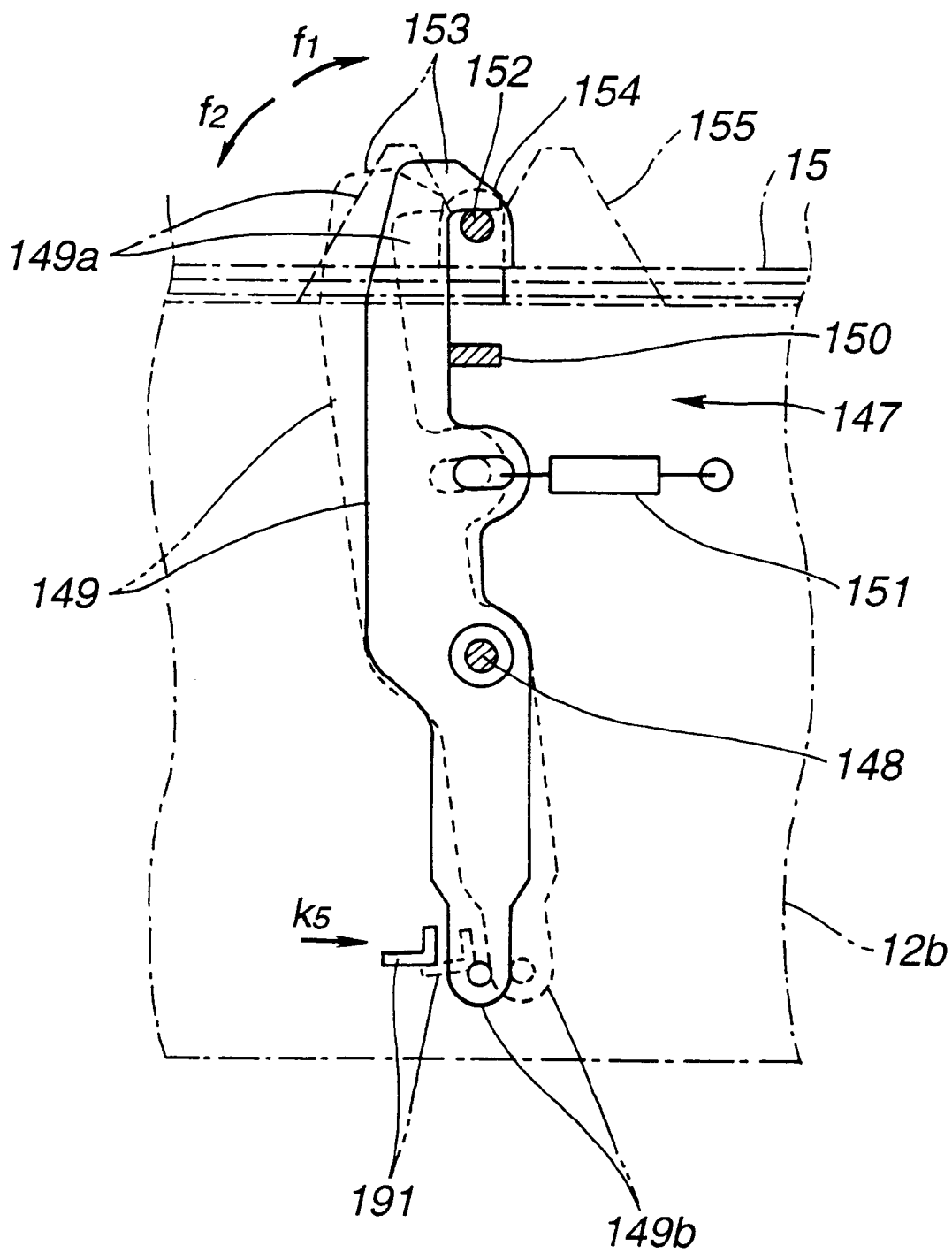
FIG. 29 is a front view showing a lock unit of the operating panel.

Referring to FIG. 29, lock means 147 for locking the operating panel 15 in the closure position indicated by a solid line in FIG. 27 is made up of a lock lever 149, a tension coil spring 151 and a mating lock pin 152. The lock lever 149 is arranged upright within the wall thickness of the upstanding front end wall 12a of the main body portion of the video editing device 12 for rotation in the left-and-right direction indicated by arrows $f_1$ and $f_2$ about a rotational fulcrum point 148 as the center of rotation. The tension coil spring 151 serves as biasing means for rotationally biasing the lock lever 149 in the lock direction (direction of arrow $f_1$) in which the lock lever compresses against the stop 150 so as to be halted in the upstanding position. The mating lock pin 152 is secured to an operating panel chassis 90 within the interior of the front end face 15b of the operating panel 15. A lock pawl 153 is formed at an upper end 149a of the lock pawl 149. The upper end face of the lock pawl 153 is formed as a cam 154 for guiding the mating lock pin 152. On the upper end face of the front end wall 12b of the main body portion of the video editing device 12 are formed left and right paired guide protrusions 155 for guiding the mating lock pin 152. A lock pawl 146 in the operating panel 15, into which is inserted the lock pawl 145 of the display panel 14, is formed as an elongated through-hole formed in the up-and-down direction (direction of thickness) of the operating panel 15. This lock hole 146 is used simultaneously as a manual unlock operating portion.

If the operating panel 15 is closed to the closure position shown in FIG. 28 from the direction of arrow $e_2$ in FIG. 28, the mating lock pin 152 compresses against the cam 154 of the lock lever 149 from the direction of arrow $e_2$. By this cam 154, the lock lever 149 escapes in the direction of arrow $f_2$ against the force of the tension coil spring 151, after which it is rotationally reset in the direction indicated by arrow $f_1$ so that the lock pawl 153 is engaged with the upper side of the mating lock pin 152 thus locking the operating panel 15 in the closure position. After closure of the operating panel 15, the display panel 14 is closed from the direction of arrow $d_2$ to the closure position indicated by a chain-dotted line in FIG. 27 in the manner of folding the display panel 14 over the upper portion of the operating panel 15. This inserts the lock pawl 145 into the lock hole 146 to cause the lock pawl 145 to be slidingly engaged with the mating lock pin 152 of the operating panel 15 from the opposite side with respect to the lock pawl 153 of the lock lever 149 to lock the display panel 14 in the closure position. Thus, the mating lock pin 152 operates simultaneously as a lock pin for the display panel 14.

(10) Explanation of Cassette Compartment

Referring to FIGS. 30 to 35, a cassette compartment 160 of the pop-up type equivalent to the cassette attachment/detachment means is used for the video tape recorder 16. This cassette compartment 160 is supported by left and right paired pop-up levers 161, the rear ends of which are mounted for movement in the up-and-down direction as indicated by arrows $g_1$ and $g_2$ via left and right paired rotational fulcrum point 163 on a video tape recorder chassis 162 formed by a metal plate. Left and right paired pop-up levers 161 are biased to the upward position in the upward direction indicated by arrow $g_1$ shown in FIG. 31 and FIG. 10B (as viewed in the direction of arrow V in FIG. 10A) from the downward position shown in FIG. 30. By left and right paired tension coil springs 166, the above-mentioned left and right paired rotational fulcrum points 143, 144 and 163 are arranged in proximity to one another. The tension coil springs 166 serve as upward biasing means and are mounted under an initial tensile stress between the lower end of the rear end of the left and right paired pop-up lever 161 and the video tape recorder chassis.

In actuality, the forward end of the cassette compartment 160 is rotatably mounted by left and right paired rotational fulcrum points 167 on the inner sides of the forward ends of the left and right paired pop-up lever 161. Left and right paired position controlling levers 169 are rotatably mounted on the rear end of the cassette compartment 160 via left and right paired rotational fulcrum points 168. The lower ends of the levers 169 are rotatably mounted via left and right paired rotational fulcrum points on a video tape recorder chassis 162. Left and right paired guide pins 171, mounted on the upper ends of the left and right paired position controlling levers 169 are loosely fitted in substantially v-shaped left and right paired guide grooves 172 formed in the left and right paired pop-up lever 161.

Figure 30:
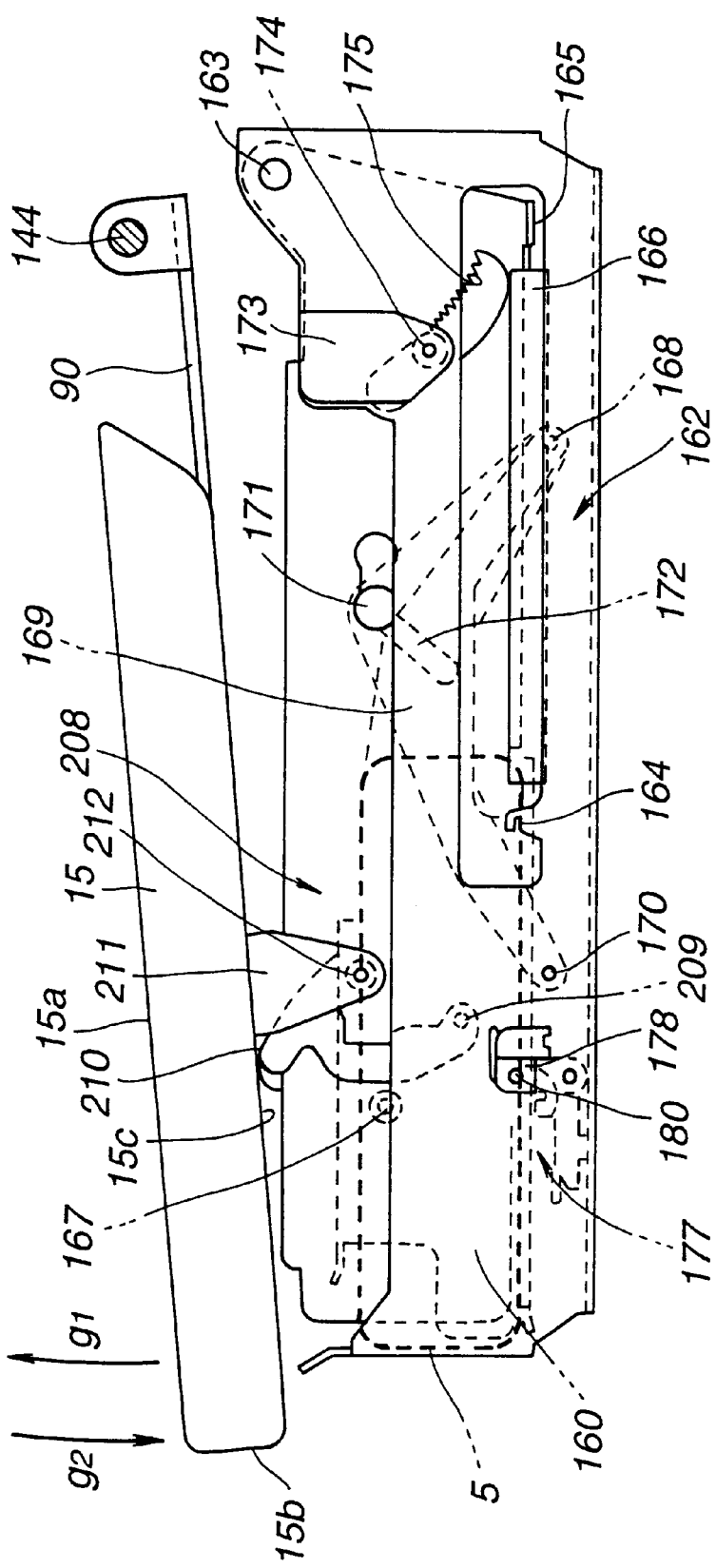
FIG. 30 is a side view showing a pop-up type cassette compartment in the down-state.
Figure 31:
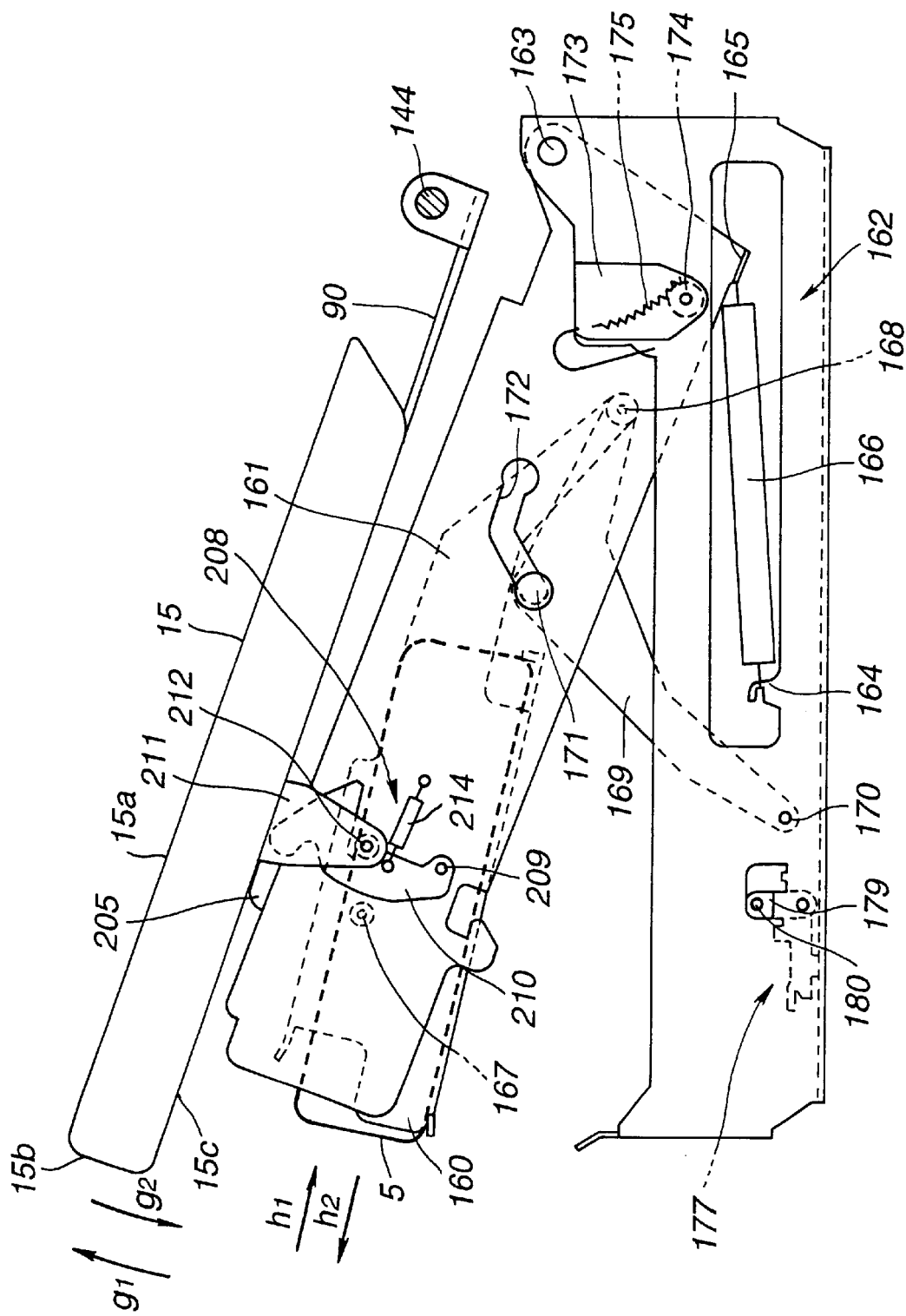
FIG. 31 is a sided view showing a pop-up type cassette compartment in the down-state.

Thus, when the cassette compartment 160 is moved in an up-and-down direction as indicated by arrows $g_1$ and $g_2$ between a downward position shown in FIG. 30 and an upward position shown in FIG. 31 by the left and right paired pop-up lever 161, the cassette compartment 160 is controlled in its rotation by the left and right paired position controlling levers 169 about the left and right rotational fulcrum point 167, such that, in the downward position, the cassette compartment 160 is in a horizontal position parallel to the left and right paired pop-up lever 161, whereas, in the upward position, the cassette compartment 160 is controlled to a tilt angle smaller than the tilt angle of the left and right paired pop-up lever 161 so that the movement of the tape cassette 4 relative to the cassette compartment 160 in an entrance/exit direction indicated by arrow $h_1$ and $h_2$ will not be obstructed by the operating panel 15 stacked on top of the cassette compartment 160.

A unidirectional damper 173 mounted on a lateral surface of the video tape recorder chassis 162 has a pinion 174 meshing with an arcuate rack 175 mounted on the pop-up lever 161 centered about the rotational fulcrum point 163, such that, if the cassette compartment 160 is manually lowered in the direction of arrow $g_2$ from the upward position to the downward position against the left and right paired tension coil springs 166, the load is decreased, whereas, if the cassette compartment 160 is manually raised in the direction of arrow $g_1$ from the downward position to the upward position under the force of the left and right paired tension coil springs 166, the load is increased.

On the inner lateral surface of the video tape recorder chassis 162, there is mounted lock means 177 for locking the cassette compartment 160 in its downward position. This lock means 177 is made up of a lock lever 179, a lock pin 180, a torsion spring 182 and a lock pawl 184. The lock lever 179 is rotatably mounted on the video tape recorder chassis 162 via a rotational fulcrum point 178 for rotation in the fore-and-aft direction indicated by arrows $i_1$ and $i_2$, and the lock pin 180 is mounted on the upper end of the lock lever 179. The torsion spring 182 is biasing means mounted on the video tape recorder chassis 162 via spring retention pin 181 for rotationally biasing the lock lever 179 to a stop position in a direction indicated by arrow $i_1$. The lock pawl 184 has a cam 183 on the lower end of a lateral side of the pop-up lever 161 on the side of the cassette compartment 160. On this lock means 177 is mounted an unlock lever 185 equivalent to unlock means. The unlock lever 185 is loosely fitted by a guide pin 186 in a guide groove 187 formed in the video tape recorder chassis 162 for movement freely in the for-and-aft direction indicated by arrow $j_1$, $j_2$. The unlock lever 185 has its one end 185a rotatably connected to the lock pin 180.

Figure 34:
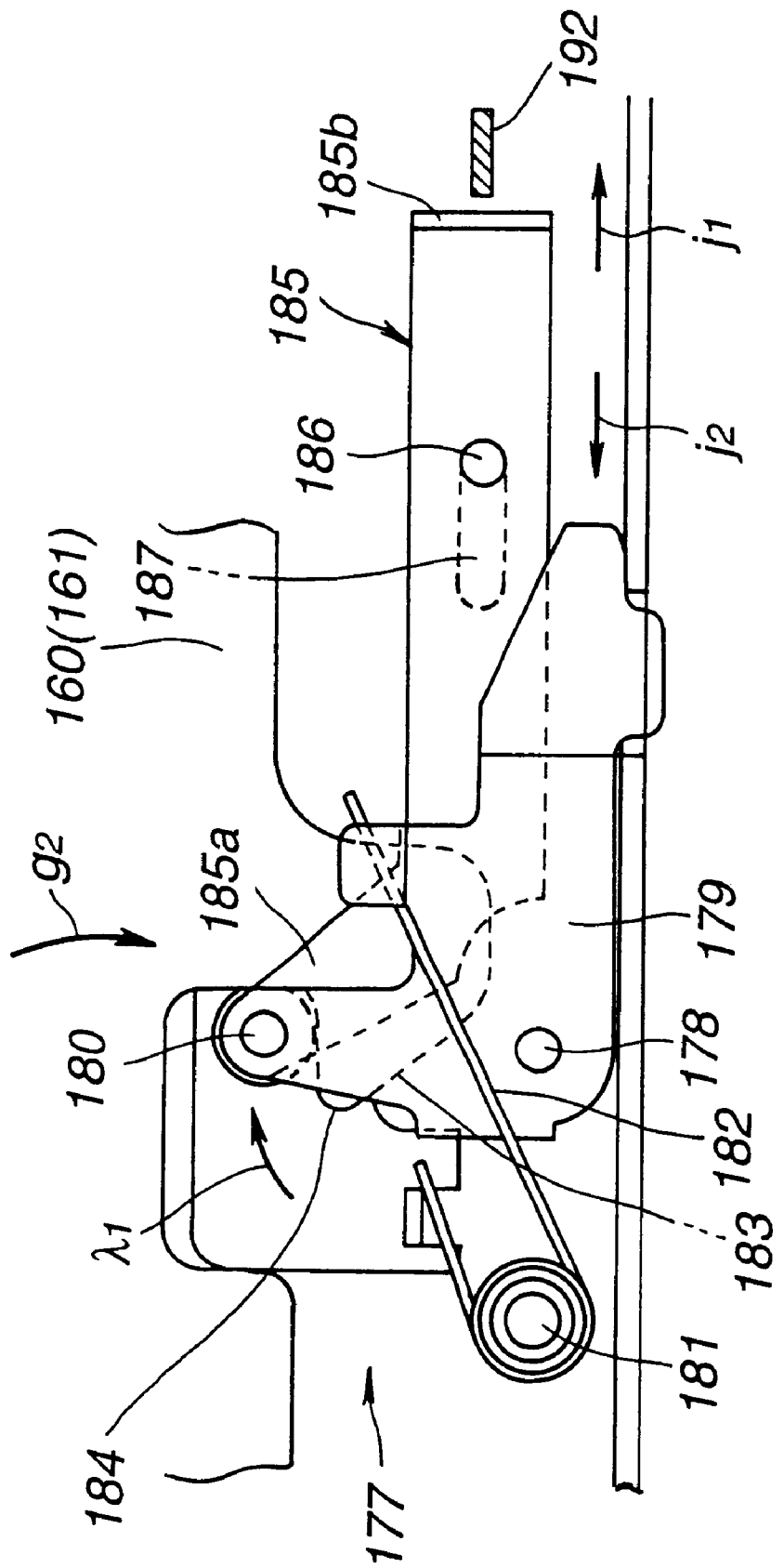
FIG. 34 is a side view, looking from inside, showing the lock unit of the cassette compartment in the down state.

Thus, when the cassette compartment 160 is lowered in the direction of arrow $g_2$ to the downward position shown in FIG. 30, the cam 183 of the lock pawl 184 compresses against the lock pin 180 as shown in FIG. 34 to relieve the lock pin 180 transiently in the direction of arrow $i_2$ against the force of the torsion spring 182 as shown in FIG. 34. The lock pin 180 is rotationally reset in the direction of arrow $i_1$ as shown in FIG. 34 so that the lock pawl 184 is engaged with the lower side of the lock pawl 184 to lock the cassette compartment 160 in its downward position. The tape cassette 4 is loaded on the video tape recorder 16 by the cassette compartment 160. The tape cassette 4 is loaded by the cassette compartment 160 on the video tape recorder 16.

Figure 35:
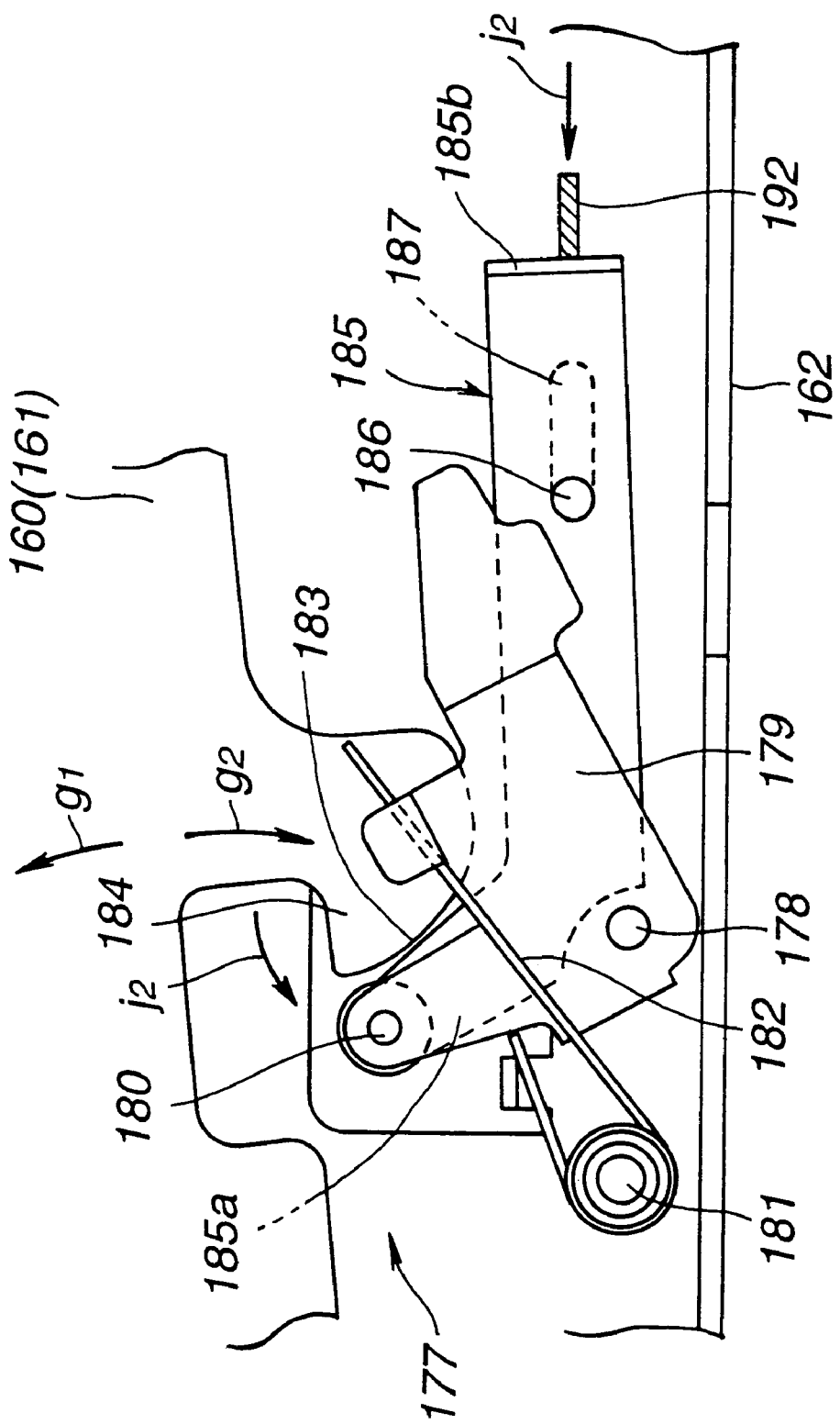
FIG. 35 is a side view showing the unlock operation of the lock unit.

Then, if the EJECT button 45 of the portable video editing devices 2, 3 is thrust, a magnetic tape T in the video tape recorder 16 is first unloaded and the unlock lever 185 is then thrust in the direction of arrow $j_2$ by automatic releasing means, as later explained, as shown in FIG. 35. This causes the lock pin 180 to escape in the direction of arrow $i_2$, against the force of the torsion 182, so that the locked state of the cassette compartment 160 at the downward position is automatically released. The cassette compartment 160 is automatically popped up from the downward position in FIG. 30 to the upward position in FIG. 31 under the force of the two tension coil springs 166.

Figure 36:
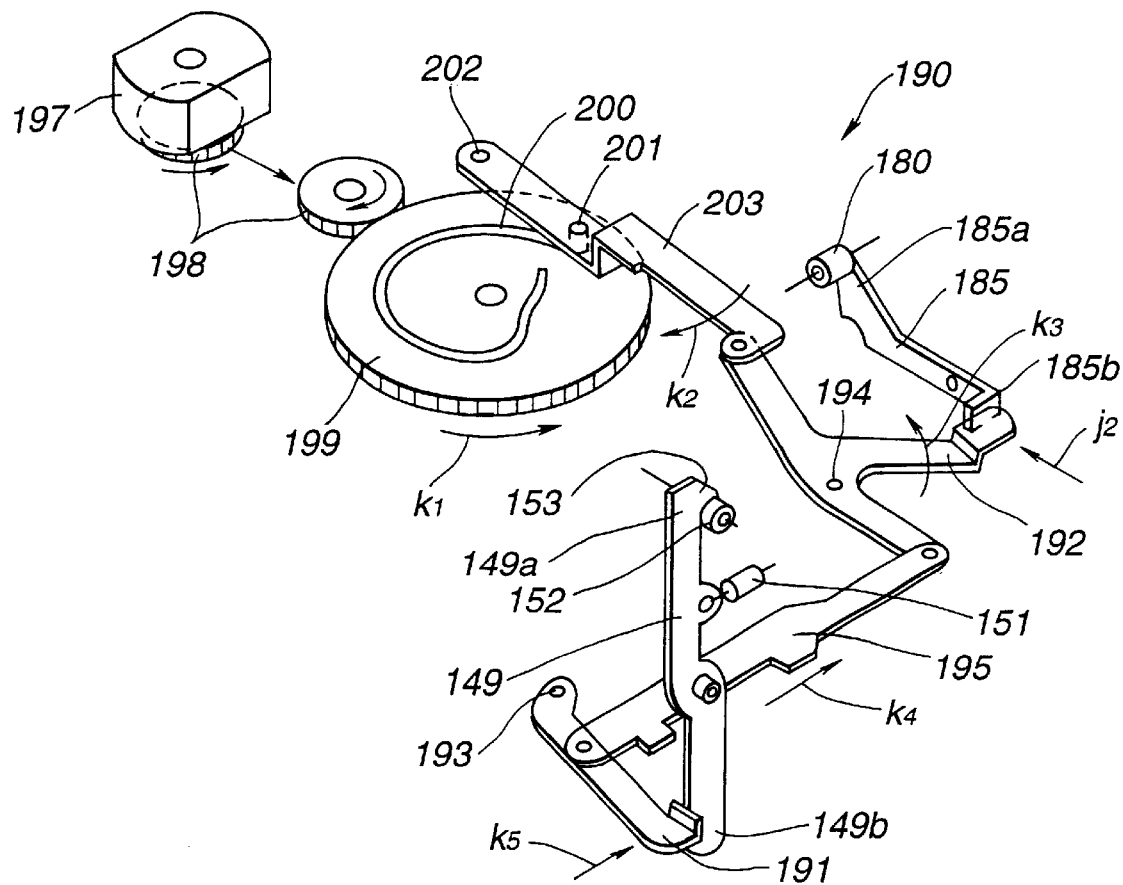
FIG. 36 is a perspective view showing an automatic unlock unit for simultaneously automatically unlocking the two lock units of the cassette compartment and the operating panel.

(11) Explanation of the Automatic Ejection Mechanism of the Cassette Compartment Referring to FIG. 36, an automatic ejection mechanism 190 of the cassette compartment 160 is comprised of plural levers mounted on the video tape recorder chassis 162. That is, the automatic ejection mechanism 190 has two unlock levers 191, 192 corresponding to the unlock means for the operating panel 15 and the cassette compartment 160, respectively. These unlock levers 191, 192 are rotatably mounted via rotational fulcrum points 193, 194 and operatively interconnected by an interlock link 195. A function cam 199, rotationally driven in the forward and reverse directions by transmission means, such as a gear train 198, by a loading motor 197 of a tape loading mechanism, as later explained, is designed as driving means. A cam follower lever 203, run in rotation about a rotational fulcrum point 202 by a cam mechanism comprised of a cam groove 200 formed in the function cam 199 and a cam follower pin 201 loosely fitted in the cam groove 100, has its distal end directly coupled to the unlock lever 192.

During the above-described video editing operation, the cassette compartment 160 is lowered to the downward position and locked as shown in FIG. 27. The magnetic tape T is loaded on the video tape recorder 16, with the magnetic tape T being loaded on the tape running path. The operating panel 15 is closed to its closure position and locked. If, after the end of the video editing operation, the EJECT button 45 on the operating panel 15 is thrust, the function cam 199 is rotated in the direction indicated by arrow $k_1$, by the loading motor 197 of the tape loading mechanism, as shown in FIG. 36, in order to unload the magnetic tape T. By the overstroke operation following the unloading operation, the cam follower lever 203 is rotated in the direction of arrow $k_2$, by the cam mechanism comprised of the cam groove 200 and the cam follower pin 201, while the unlock lever 192 is rotated in the direction indicated by arrow $k_3$, at the same time as the connecting link 195 is moved in the direction indicated by arrow $k_4$, with the unlock lever 191 being rotated in the direction indicated by arrow $k_5$.

Then, the unlock lever 191 thrusts a lower end 149b of the lock lever 149 of the unlock means 147, locking the operating panel 15 in the closure position, in the direction indicated by arrow $k_5$, as shown in FIG. 29, for rotating the lock lever 149 in the direction of arrow $f_2$ against the force of the tension coil spring 151 to unlock the operating panel 15 at the closure position. Simultaneously, the unlock lever 192 thrusts an opposite end 185b of an unlock lever 185 of the lock means 177 locking the cassette compartment 160 at the downward position, in the direction indicated by arrow $j_2$, as shown in FIG. 35, to cause the lock lever 197 to be rotated by the unlock lever 185 against the force of the torsion spring 182 in the direction indicated by arrow $i_2$ to unlock the cassette compartment 160 in its downward position.

Then, as shown in FIGS. 28 and 31, the cassette compartment 160 is automatically popped up by the two tension coil springs 166 from the downward position to the upward position in the direction indicated b yarrow $g_1$. This causes the cassette compartment 160 to raise automatically the operating panel 15 from the closure position to the open position in the direction indicated by the arrow $e_1$. The tape cassette 4 is automatically ejected upwardly of the main body portion of the video editing device 12. At this time, the operating panel 15 is raised in the direction indicated by arrow $e_1$ by left and right paired substantially hemi-circular-shaped uplifting projections 205 mounted on left and right ends on the upper surface of the cassette compartment 160.

If, after exchanging the tape cassette 4 for the cassette compartment 160, the cassette compartment 160 is again lowered to the downward position for locking, the operating panel 15 is manually lowered in the direction of arrow $e_2$, as shown in FIG. 28, and the cassette compartment 160 is lowered to its downward position by the operating panel 15. At this time, the operating panel 15 is abutted transversely on left and right paired uplifting projections 205 so that the cassette compartment 160 can be reliably lowered to this downward position in an accurately transverse position. Thus, the cassette compartment 160 can be locked reliably at all times in the downward position, at the same time that the transverse position of the cassette compartment 160 itself can be corrected by highly stiff operating panel 15, thus enabling the cassette compartment 160 to be lowered in stiffness to lower the cost.

(12) Explanation of the Maintenance Operation of the Video Tape Recorder

Figure 37B:
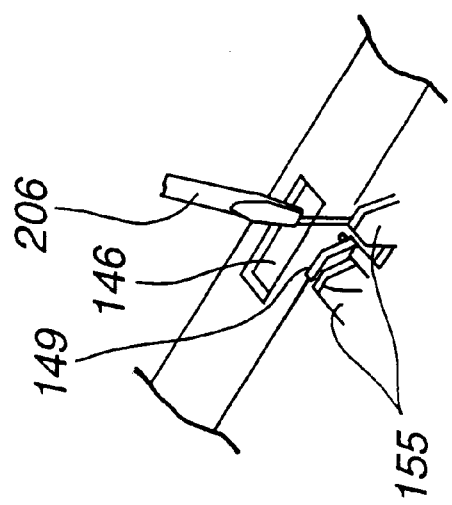
FIGS. 37A–37B are a perspective view showing the portable video editing device used for illustrating the manual unlocking of the lock unit.
Figure 37A:
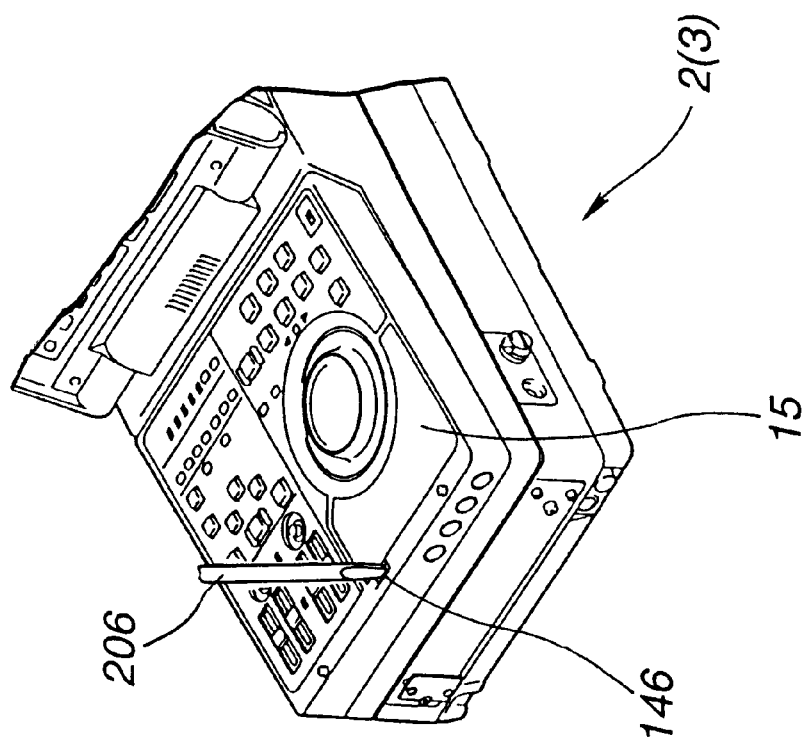
Figure 39:
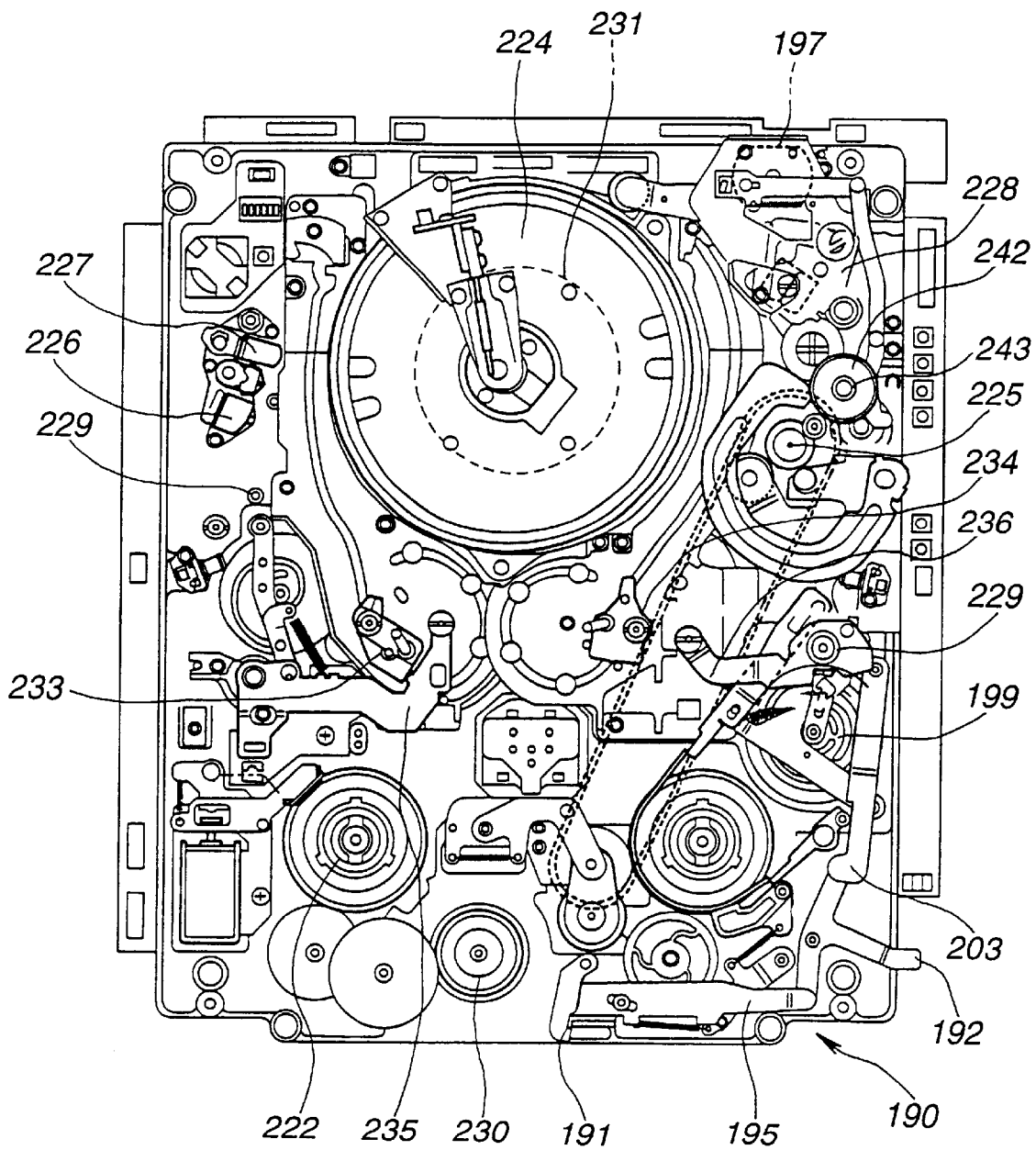
FIG. 39 is a perspective view showing a loading unit for a tape recorder of the portable video editing device.

Referring to FIGS. 37, 38A and 38B, a simple tool 206, such as a driver, is inserted from above into a lock hole 146 in the operating panel 15, with the cassette compartment 160 lowered to its downward position and locked there, and the lock lever 149 is caused to escape in the direction of arrow $f_2$, against the force of the tension coil spring 151, the locked state of the operating panel 15 at the closure position can be released easily. After unlocking, the operating panel 15 can be opened from the closure position of FIG. 27 to the opened position for maintenance, as indicated by a chain-dotted line in FIGS. 26 and 28, through a larger opening angle of $\theta_2+\theta_3$.

This widely opens an upper portion of a tape loading mechanical portion arranged rearwardly of the cassette compartment 160 of the video tape recorder 16, so that the user can readily perform routine maintenance and inspection of manually cleaning various component portions on the tape running path, such as rotary head drums, stationary heads or tape guides, using cleaning cloths or the like. If the magnetic tape T is slacked on the tape running path, the operating panel 15 can be opened widely to the opened position for maintenance for manually taking out the magnetic tape T.

(13) Explanation of Connecting Means for Operating Panel and Cassette Compartment Meanwhile, in the above-described system for automatically ejecting the cassette compartment 160, a springback phenomenon, accompanied by an impact sound produced when the operating panel 15 makes descent after once springing up in the direction of arrow $e_1$ from the cassette compartment 160 by the force of inertia caused by impact produced by the halting of the cassette compartment 160 at the upward position when the cassette compartment 160 is popped up in the direction indicated by arrow $g_1$ from the downward position to the upward position as shown in FIGS. 28 and 31.

Thus, connection means 208 is provided for releasably interconnecting the operating panel 15 and the cassette compartment 160 is provided between the operating panel 15 and the cassette compartment 160, as shown in FIGS. 30 to 33, for preventing the springback phenomenon of the operating panel 15 from occurring at the time of popping up of the cassette compartment 160.

This connection means 208 is made up of a connection lever 210, a mating connection pin 212 and a tension coil spring 214. The connection lever 210 is connected to a lateral surface of the cassette compartment 160 for rotation in the fore-and-aft direction indicated by arrows $m_1$ and $m_2$, via rotational fulcrum point 209. The mating connection pin 212 is mounted via a mounting plate 211 on a lower portion of a lateral surface of the operating panel 15. The tension coil spring 214 is biasing means for rotationally biasing the connection lever 210 in the direction of arrow $m_1$ to a stop position on abutment against a stop 213. The mounting positions of the connection lever 210, mating connection pin 212 and the tension coil spring 214 may be reversed between the operating panel 15 and the cassette compartment 160.

On an upper free end of the connection lever 210 are formed a first engagement portion 215 having a nip angle $\theta_4$ relative to the mating connection pin and a second engagement portion 216 having an angle of relief $\theta_5$, in the form of steps. The upper end of the connection lever 210 is formed a cam 217 adapted for guiding the mating connection pin 212.

Figure 32:
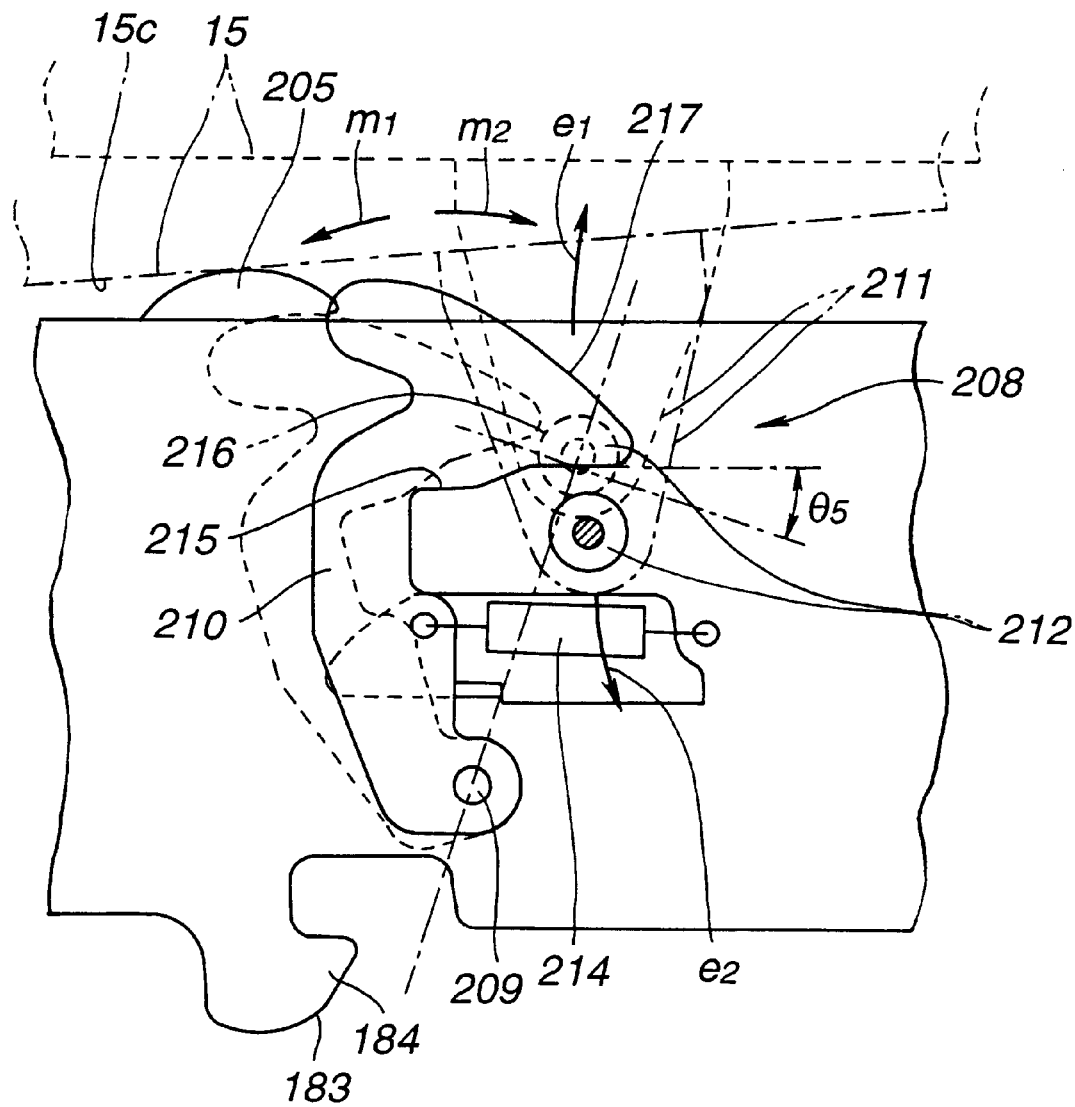
FIG. 32 is a side view showing a pop-up type cassette compartment in the down state and specifically showing the connection means between the cassette compartment and the operating panel.

In the connection means 208, if, with the cassette compartment 160 is lowered to its downward position where it is locked, as shown in FIG. 26, the operating panel 15 is closed to the closure position shown in FIG. 27 in the direction indicated by arrow $e_2$, the mating connection pin 212 is automatically engaged with the connection lever 210, as shown in FIG. 30. That is, as shown in FIG. 32, the mating connection pin 212 is abutted against a cam 217 of the connection lever 210 from the direction indicated by arrow $e_2$. This connection lever 210 is first moved in the direction of arrow $m_2$, against the force of the tension coil spring 214, after which it is rotationally reset in the direction indicated by arrow $m_1$ to cause automatic engagement of the mating connection pin 212 with a second engagement portion 216 of the connection lever 210. The connection means 208 is now in the releasable state.

Since the second engagement portion 217 has the angle of relief $\theta_5$ relative to the mating connection pin 212, if the operating panel 15 is manually unlocked and raised in the direction indicated by arrow $e_1$, such as during the above-mentioned maintenance operation, the connection lever 210 makes an escape easily in the direction of arrow $m_2$ against the force of the tension coil spring 214. Thus, the connecting state of the cassette compartment 160 of the operating panel 15 can be easily released to permit only the operating panel 15 to be opened and closed freely between the closure position and the opened position.

Figure 33:
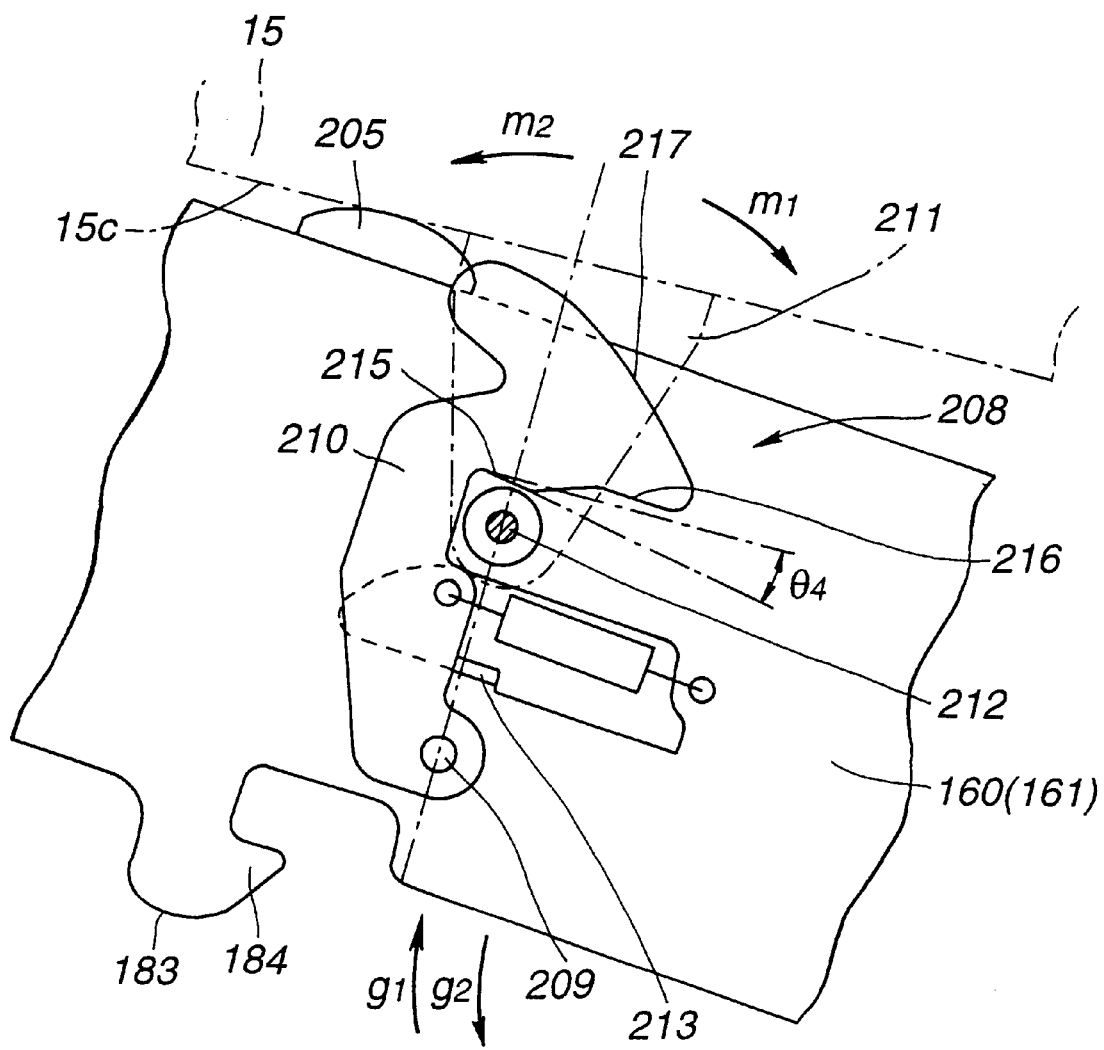
FIG. 33 is a side view showing a pop-up type cassette compartment in the popped-up state and specifically showing the connection means between the cassette compartment and the operating panel.

During the above-mentioned automatic ejection, the operating panel 15 is opened in the direction of arrow $e_1$ by the cassette compartment 160 as shown in FIG. 31. Due to the difference between the rotational fulcrum point 144 and the rotational fulcrum point 163 of the cassette compartment 160 and the operating panel 15, the mating connection pin 212 is shifted from the second engagement portion 217 to the first engagement portion 215 of the connection lever 210, as shown in FIG. 33, when the cassette compartment 160 is moved to the upward position indicated by arrow $g_1$, with the connection means 28 being in the releasing inhibiting position.

That is, since the second engagement portion 215 has the nip angle $\theta_4$ relative to the connection pin 212, the mating connection pin 215 is not disengaged from the first engagement portion 215 in a direction indicated by arrow $e_1$ even if there occurs the springback phenomenon of the operating panel 15 relative to the cassette compartment 160 indicated by arrow $e_1$. Thus it is possible with the connection means 208 to prevent the springback phenomenon of the operating panel 15 relative to the cassette compartment 160 in the direction indicated by arrows $e_1$ and $e_2$.

If the operating panel 15 is raised y the cassette compartment 160 an angle $\theta_2$ as far as the closure position for cassette ejection indicated by a solid line in FIG. 28, the connection means 208 is completely exposed to outside the main body portion of the video editing device 12. If the connection lever 210 shown in FIG. 32 is turned slightly with the finger tip in the direction indicated by arrow $m_2$ to release the connection of the operating panel 15 relative to the cassette compartment 160, the operating panel 15 can be widely opened to the opened position indicated by a chain-dotted line in FIG. 28 and further by the larger angle $\theta_3$.

(14) Explanation of Tape Loading Mechanism

Referring to FIGS. 39 to 43, the video tape recorder 16 is provided with a tape loading mechanism 221 corresponding to the tape loading means. The tape running path of the tape loading mechanism 221 is made up of a supply reel block 222, a take-up reel block 223, a rotary head drum 224, a capstan 225, a full erasure head 226, a CTL head 227, an audio head 228 and plural tape guides 229. There are also annexed a reel motor 230 for rotationally controlling the supply reel block 221, a drum motor 231 for rotationally controlling the rotary head drum 224 and a capstan motor 232 for rotationally controlling the take-up reel block 222.

The tape pull-out means in the tape loading mechanism 221 is made up of a supply slider 233 carrying an inclined guide and a vertical guide, a take-up slider 234, a supply tension regulating arm 235, a take-up supply tension regulating arm 236 and a pinch roll 237. There is also annexed a loading motor 197 for driving these components and the above-mentioned function cam 199.

Figure 40:
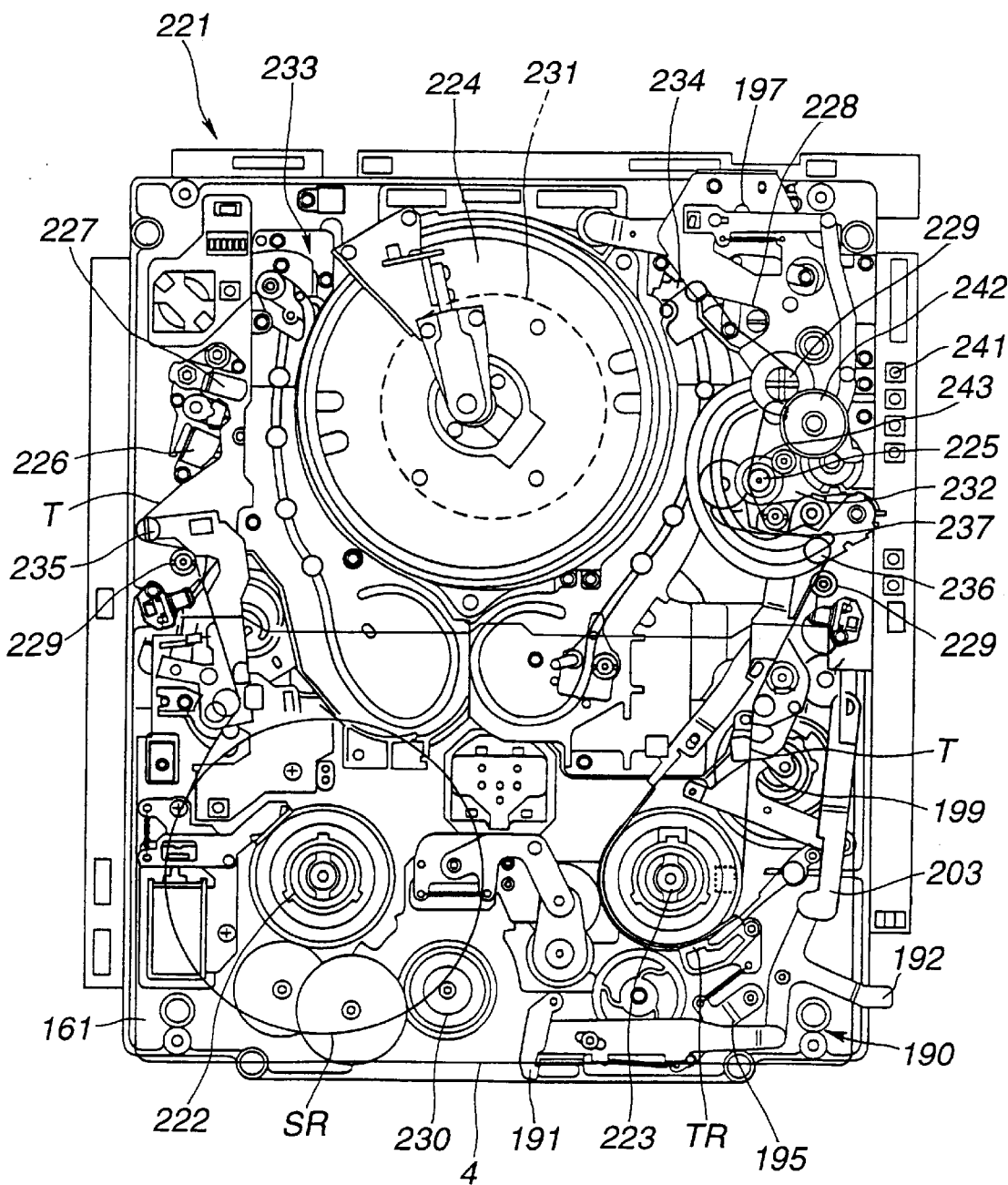
FIG. 40 is a perspective view showing the tape loading state as set by the tape loading unit.
Figure 41:
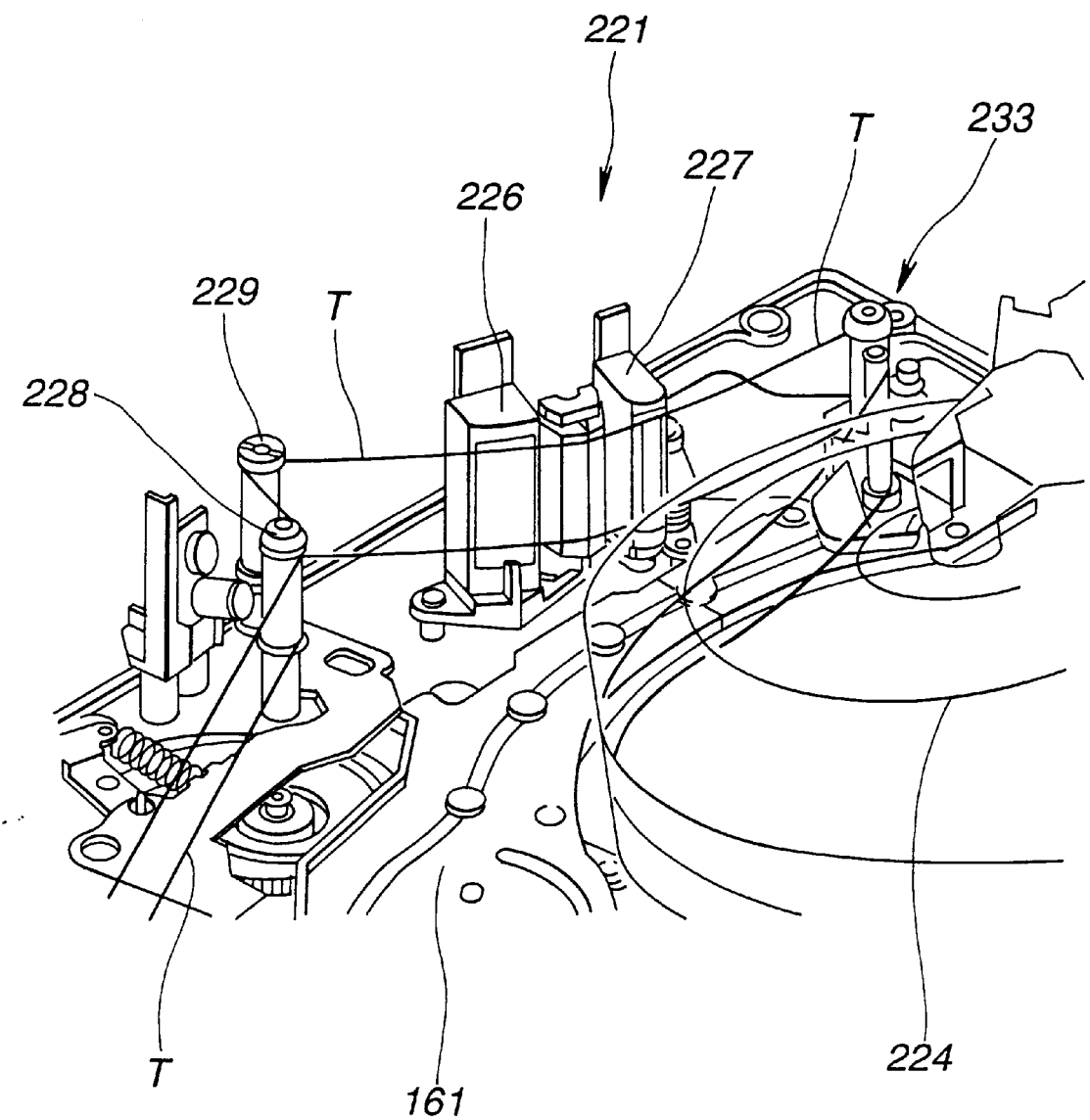
FIG. 41 is a perspective view showing a drum inlet side of the tape loading mechanism.

When the tape cassette 4 is loaded in the downward position by the cassette compartment 160 as described above, the left and right paired tape reels SR, TR in the tape cassette 4 are horizontally engaged on the supply and take-up reel blocks 222, 223, as shown in FIGS. 40 and 41. The function cam 199 is then driven by the loading motor 197 shown in FIG. 36 to set a tape loading mode, so that the magnetic tape T in the tape cassette 4 is pulled out by the supply slider 233, take-up slider 234, supply tension regulator 235, take-up tension regulator 236 and the pinch roll 237 so as to be loaded on the tape running path. The rotary head drum 224 is rotationally controlled by the drum motor 231, at the same time as the rotational control of the supply reel block 222 by the reel motor 230, rotational control of the capstan 225 and the take-up reel 233 by the capstan motor 232 and pressure engagement/disengagement of the pinch roll 237 relative to the capstan 231 are carried out to effect running control of the magnetic tape T on the tape running path (constant-speed running, fast feed, rewind, jog/shuttle mode running , and so forth) by way of performing the above-mentioned video editing operation for the magnetic tape T.

If, after the end of the video editing operation, the EJECT button 45 is thrust, the function cam 199 is rotated in reverse by the loading motor 197 to effect the operation for the tape unloading mode to restore the supply slider 233, take-up slider 234, supply tension regulating arm 235, take-up supply tension regulating arm 236 and the pinch roll 237 into the tape cassette 4, at the same time as the magnetic tape T is rewound into the supply reel SR. By this overstroke operation of the tape unloading mode, the above-mentioned automatic unlock operation for the cassette compartment 160 and the operating panel 15 is performed to eject the tape cassette 4 to the upward position.

In the above-described routine maintenance and inspection operations, the fixed heads, such as rotary head drum 224, full erasure head 226, CTL head 226. CTL head 227 or the audio head 228, and the tape guide 229, are cleaned using a cleaning cloth or the like.

Figure 42:
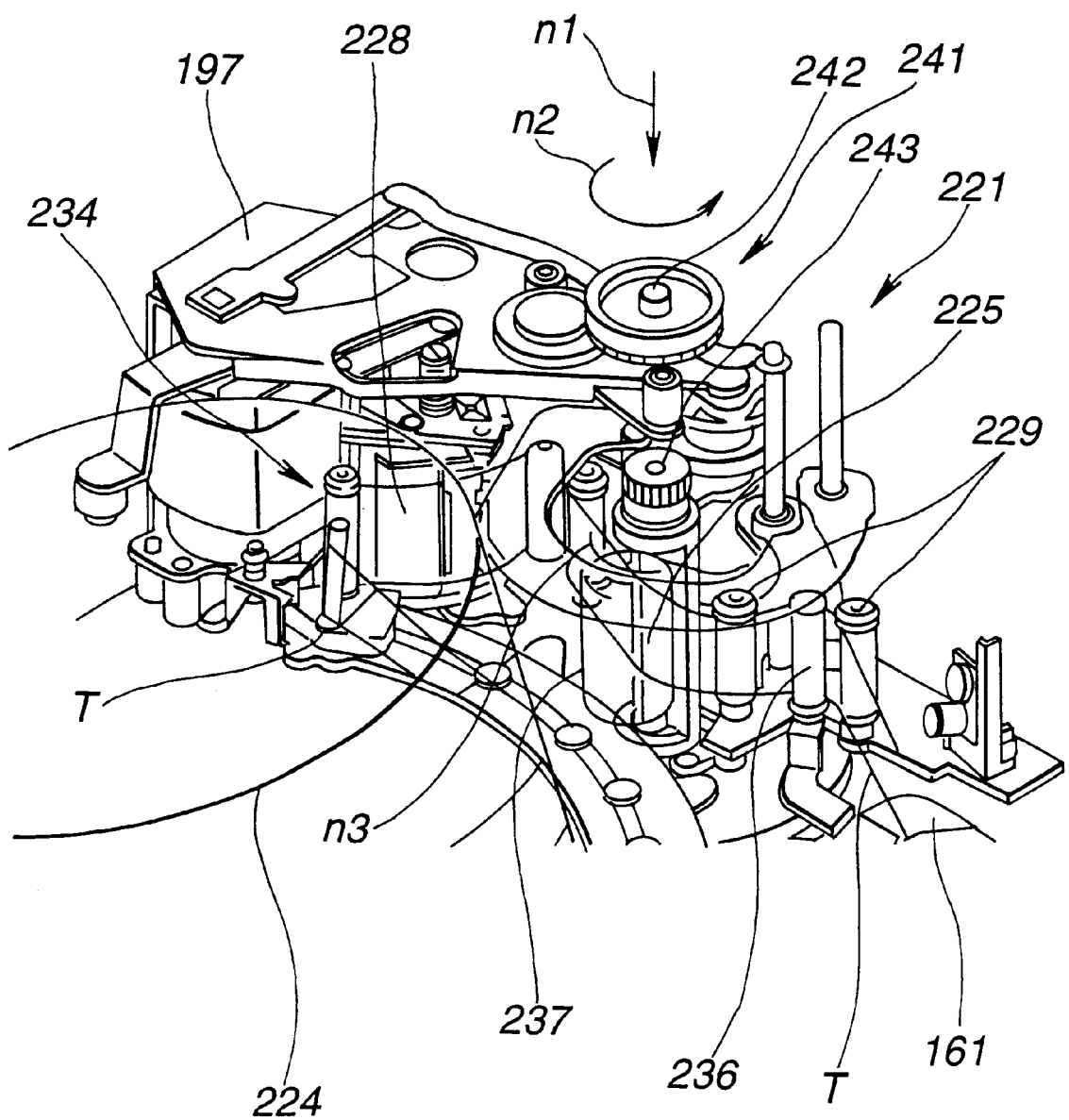
FIG. 42 is a perspective view showing a drum outlet side of the tape loading mechanism.
Figure 43:
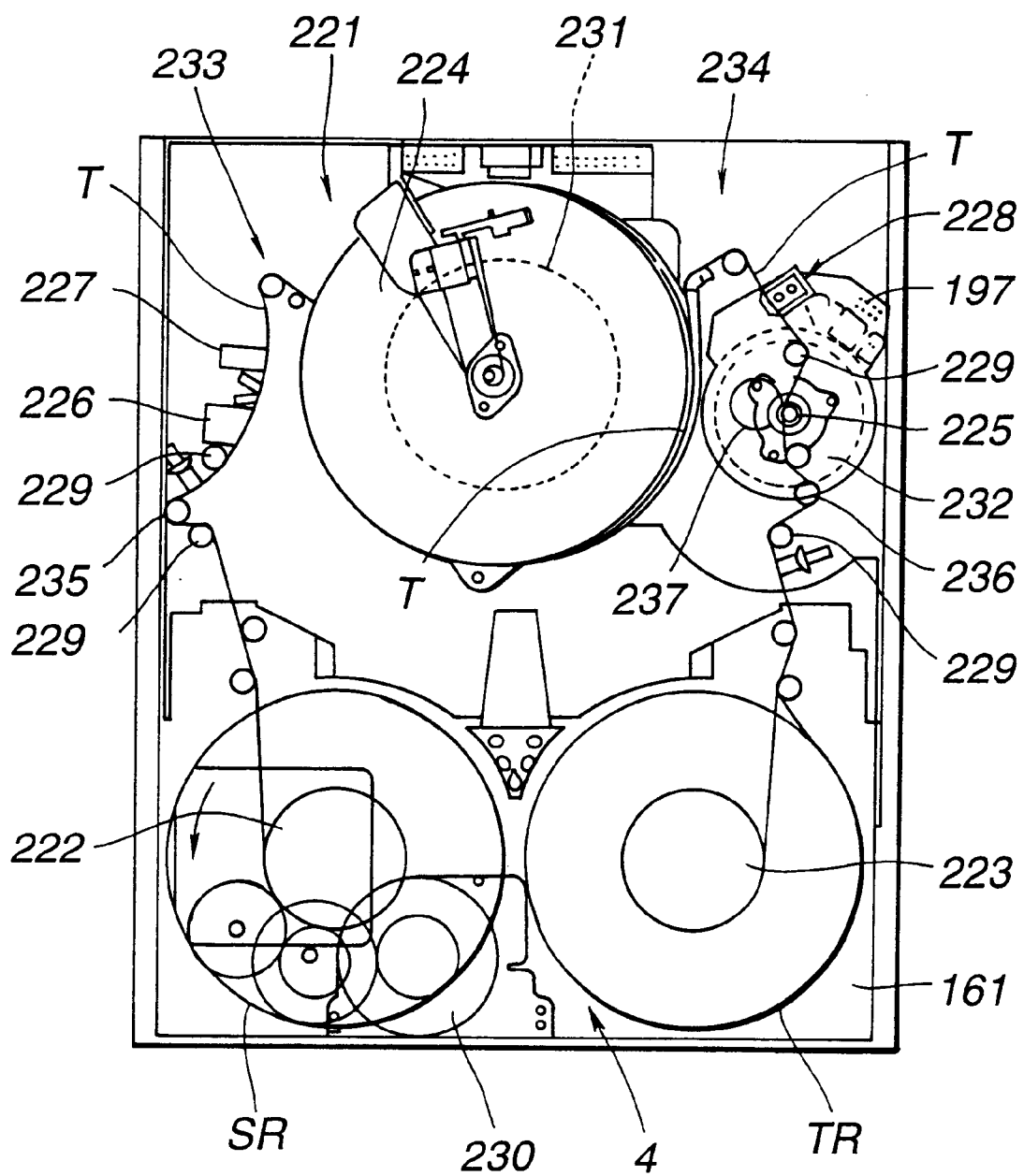
FIG. 43 is a plan view showing a drum outlet side of the tape loading mechanism.

If the magnetic tape T is slacked in the tape loading mechanism 221 to disable unloading, a manual ejection knob 242 of manual ejection means 241, shown in FIG. 42, is rotated counterclockwise, as indicated by arrow n2, as the knob 242 is pressed down by manual operation as indicated by arrow n1. This causes the function cam 199 to be rotated automatically to reduce the load on the slacked magnetic tape T. The capstan cap 244 is held and, by the same manual operation, the capstan cap 225 is sequentially rotated directly counterclockwise, as indicated by arrow n3. This progressively takes up the magnetic tape T on the take-up reel TR. After the magnetic tape T is completely taken up on the take-up reel TR, lock means 177, 147 of the cassette compartment 160 and the operating panel 15 are unlocked to permit the tape cassette 4 to be ejected by the cassette compartment 160.

In the portable video editing device according to the present invention, since the recording medium attachment/detachment space provided below the operating panel is arranged outside the operating panel so that the recording/reproducing unit can be placed in the projection area of the operating panel, while the effective area of the operating panel is adapted for not being limited by the space for attachment/detachment of the recording medium, the degree of freedom in arranging the operating buttons and switches on the operating panel can be assured to realize high operatability in the video editing operation.

Since the recording/reproducing unit can be arranged in the projection area of the operating panel, the operating panel of the portable video editing device can be used simultaneously as an upper cover of the recording/reproducing unit, thus reducing the number of component parts and the assembling steps for reducing the size of the portable video editing device.

Therefore, the portable video editing device can be transported easily to the site of news data collection when doing the news data collection using a video camera. After collection of the news data, the user who is most aware of the contents of the news can immediately perform the video editing operation on the site for preparing a tape for broadcast from the original tape loaded on the video camera, whilst the contents of the news are still vivid in his or her memory. Thus, the tape for correctly sending on air the contents of the news with the on-the-spot feeling can be prepared easily in a shorter time to respond to the demand for fast reporting.

Since the recording medium of the recording/reproducing unit can be mounted/dismounted by opening the openably constructed operating panel, the recording medium can be mounted or dismounted easily.

Moreover, since the operating panel of the portable video editing device can be rotated freely, while the recording medium attachment/detachment mechanism is designed by a pop-up type so that the mechanism can be uplifted substantially in the same direction as the operating panel this enabling the recording medium to be attached or detached by a one-touch operation.

In the portable video editing devices, since the display panel can be opened/closed by being collapsed on top of the operating panel, the display panel can be collapsed on the upper portion of the operating panel during transportation of the editing device, so that the device can be reduced in size by collapsing the display panel on the top of the operating panel during transportation of the portable video editing device to improve portability of the portable video editing device.

Since the recording/reproducing unit of the portable video editing device is comprised of a playback-dedicated portion and a recording-dedicated portion, the portable video editing device can be separated into the playback-dedicated portion and the recording-dedicated portion to render it possible to reduce the size of each portion to improve portability of the device further. Moreover, if the video camera is used for the playback portion, it suffices if only the recording-dedicated sole portable video editing device is brought to the site of news data collection thus improving mobility in news data collection.

Since the recording/reproducing unit of the portable video editing device is constructed by the cassette type vide tape recorder, the video editing operation can be performed by directly reproducing the cassette of the pre-existing cassette type video camera, thus displaying high economic merits.

Also, since the portable video editing device includes carrying means, the portable video editing device can be further improved in portability.

The portable video editing device also includes reproducing means for controlling the playback of the camera-built-in type recording/reproducing apparatus and editing means for receiving the reproduced video data to edit and record the video data on a recording medium, the image photographed by the camera-built-in type recording/reproducing apparatus cam be edited on the spot. Thus, with the present portable video editing device, the video editing operation for preparing the tape for broadcast can be performed immediately and highly efficiently, such that the tape for correctly sending on air the contents of the news with the on-the-spot feeling can be prepared easily in a shorter time to respond to the demand for fast reporting.

With the portable video editing device, having shuttle control means and resetting means for resetting the shuttle mode without varying the operating position of the shuttle control means, the shuttle mode can be promptly reset during the video editing operation whilst the editing operation is performed by the shuttle control means. This assures high operatability in performing the video editing operation. Since it is unnecessary to provide a shuttle mode resetting mechanism on e.g., the operating panel, a smaller number of component parts suffices, while the device can be reduced in size.

Also, since the portable video editing device includes the display unit, operating panel, recording/reproducing unit, battery loading unit and a battery that can be mounted on or dismounted from the battery loading unit, the battery can be dismounted, so that, with the portable video editing device, the battery can be loaded only during use of the portable video editing device, while it can be detached during its nonuse. Thus, the portable video editing device is of a reduced size unless during its use, such as when the user carries the device.

Although the present invention has been explained in the above, the present invention can be modified without being limited to the illustrated embodiments. For example, the recording medium can also be an optical disc cassette holding an optical disc without being limited to a tape cassette holding a magneto-optical disc. Although the operating panel in the above-described embodiments is opened/closed by rotation in the up-and-down direction, an operating panel having a display panel mounted on its top may be slid horizontally, such as in the fore-and-aft direction for opening/closure. The cassette compartment may also be of a slot-in type instead of being of the pop-up type.

What is claimed is:

1. A portable video editing apparatus comprising:
    a video editing device having a recess within which a display panel and an operating panel are housed,
    a recording/reproducing unit arranged in a lower portion of the operating panel for recording/reproducing data to/from a recording medium, and
    a recording medium attachment/detachment space is provided below the operating panel and is arranged outside the operating panel so that the recording/reproducing unit can be placed in a projection area of the operating panel.

2. The video editing apparatus as claimed in claim 1 characterized in that
    said operating panel is of the openable/closable type; and in that
    the recording medium in said recording/reproducing unit can be mounted/dismounted on opening said operating panel.

3. The video editing apparatus as claimed in claim 2 characterized in that
    said operating panel is rotatable in the up-and-down direction about a rotational fulcrum point as the center of rotation; and in that
    a recording medium mounting/dismounting mechanism of the recording/reproducing unit is of the pop-up type in which the recording medium mounting/dismounting mechanism is uplifted and lowered in substantially the same direction as the operating panel.

4. The video editing apparatus as claimed in claim 2 characterized in that
    said operating panel is of the openable/closable type in which it can be collapsed on the top of the operating panel.

5. The video editing apparatus as claimed in claim 1 characterized in that said recording/reproducing unit is comprised of a playback-dedicated portion and a recording-dedicated portion.

6. The video editing apparatus as claimed in claim 1 characterized in that said recording/reproducing unit is comprised of a cassette video tape recorder.

7. The video editing apparatus as claimed in claim 1 comprising carrying means.

8. A portable video editing apparatus comprising:
    a video editing device housing a display panel and an operating panel,
    a recording/reproducing unit arranged in a lower portion of the operating panel for recording/reproducing data to/from a recording medium,
    said video editing device further comprising a battery loading unit and means for mounting/dismounting a battery in the battery loading unit wherein the battery can only be loaded during use of the video editing device.

9. The portable editing apparatus as claimed in claim 8 characterized in that
    said battery loading unit is constructed in common with the camera-built-in type recording/reproducing apparatus.

10. The portable editing apparatus as claimed in claim 9 characterized in that
    said battery loading unit has a loading mechanism of the same structure as the battery loading/unloading mechanism of the camera-built-in type recording/reproducing apparatus.

11. The portable editing apparatus as claimed in claim 8 characterized in that
    said display unit is constructed so as to be opened/closed; and in that
    said battery loading unit is arranged on an upper panel outside the opening/closing space of said display unit.

* * * * *